United States Patent
Krone et al.

(10) Patent No.: US 11,530,920 B2
(45) Date of Patent: Dec. 20, 2022

(54) CONTROLLING MOVEMENT OF A MACHINE USING SENSOR FUSION

(71) Applicant: Caterpillar Inc., Peoria, IL (US)

(72) Inventors: Bradley P. Krone, Dunlap, IL (US); Joseph L Faivre, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 33 days.

(21) Appl. No.: 16/738,966

(22) Filed: Jan. 9, 2020

(65) Prior Publication Data
US 2021/0215483 A1 Jul. 15, 2021

(51) Int. Cl.
*G01C 21/16* (2006.01)
*G01S 19/49* (2010.01)
*G01S 19/14* (2010.01)
*G01C 21/28* (2006.01)

(52) U.S. Cl.
CPC .......... *G01C 21/165* (2013.01); *G01C 21/28* (2013.01); *G01S 19/14* (2013.01); *G01S 19/49* (2013.01)

(58) Field of Classification Search
CPC ....... G01C 21/165; G01C 21/28; G01S 19/49; G01S 19/14
See application file for complete search history.

(56) References Cited

U.S. PATENT DOCUMENTS

| | | | |
|---|---|---|---|
| 6,081,230 A | 6/2000 | Hoshino et al. | |
| 8,757,548 B2 | 6/2014 | Stecko et al. | |
| 10,401,176 B2 | 9/2019 | Nackers et al. | |
| 2015/0204901 A1 | 7/2015 | Faivre et al. | |
| 2018/0372498 A1* | 12/2018 | Nackers | G01C 21/165 |
| 2019/0154449 A1 | 5/2019 | Roumeliotis et al. | |
| 2020/0200537 A1* | 6/2020 | Ceisel | G01C 25/00 |

FOREIGN PATENT DOCUMENTS

CN 109631883 A 4/2019

OTHER PUBLICATIONS

Horton, Mike; What can a CAN bus IMU do to make an autonomous vehicle safer?; Jun. 25, 2019, Medium.com (Year: 2019).*

* cited by examiner

*Primary Examiner* — Aniss Chad
*Assistant Examiner* — Chase L Cooley
(74) *Attorney, Agent, or Firm* — Lee & Hayes, P.C.

(57) ABSTRACT

A method of controlling movement of a machine may include receiving, from a plurality of IMU modules mounted on a corresponding plurality of components of the machine, a plurality of signals indicative of orientation measurements and motion measurements for the components of the machine on which the plurality of IMU modules are mounted. The IMU modules include a corresponding number of state estimators, and form a mesh network communicatively coupled to a communication bus. The method may also include fusing the signals, determining estimates of output orientation data and output motion data for the components of the machine based on the fused signals, determining a real time value for at least one of position, velocity, or acceleration of the components of the machine based on a kinematic evaluation, and applying the determined real time value in an implementation of a controlled operational movement of the components of the machine.

20 Claims, 8 Drawing Sheets

CONTROLLING MOVEMENT OF A MACHINE USING SENSOR FUSION

TECHNICAL FIELD

The present disclosure relates to systems and methods of controlling movement of a machine. More particularly, the present disclosure relates to systems and methods of controlling movement of a machine using communicatively coupled inertial measurement unit (IMU) modules mounted on components of the machine.

BACKGROUND

Machines such as, for example, excavators, dozers, graders, wheel loaders, wheel tractor scrapers, and other types of heavy equipment and other types of vehicles are used to perform a variety of tasks. In order to effectively control the machines, accurate and responsive sensor readings obtained from a variety of types of sensors provide information in near real time to a machine controller and/or operator, and that information is used by the machine controller of another processing device to perform calculations. Further, autonomously and semi-autonomously controlled machines can operate with little or no human input by relying on information received from various machine systems including these sensors. For example, based on machine movement information, terrain information, and/or machine information, a machine may be controlled to remotely and/or automatically complete a programmed task. By receiving appropriate feedback from each of the different machine systems and sensors during performance of the task, continuous adjustments to machine operation may be made that help to ensure precision and safety in completion of the task. In order to do so, the information provided by the different machine systems and sensors must be accurate and reliable. For instance, accurate sensor information about the position, velocity, and distance traveled by the machine, as well as positions, movements, and orientations of different parts or components of the machine may be useful in providing effective and accurate control of the machine and its operations.

Some machines may utilize a navigation or positioning system to determine various operating parameters such as position, velocity, pitch rate, yaw rate, and roll rate for the machine and components of the machine. The component of the machine may include any device attached to and controlled by the machine such as, for example, traction devices, wheels, a machine body, a hydraulic swivel, a boom, a stick, a work tool, a blade, a dump bed, a bucket, an arm, a breaker, a grapple, a thumb, an auger, and other elements mechanically, hydraulically, and/or electrically coupled to the machine.

The position and orientation of the machine is referred to as the "pose" of the machine. The machine "state" includes the pose of the machine as well as various additional operating parameters that may be used to model the kinematics and dynamics of the machine, such as parameters characterizing the various links, joints, tools, hydraulics, and power systems of the machine. As used herein, the pose may include position, velocity, acceleration, orientation, specific force, angular rate, pitch rate, yaw rate, roll rate and other parameters associated with the movement of the machine and components coupled to the machine. Some machines utilize a combination of a of global positioning system (GPS) device data, global navigation satellite system (GNSS) data, a distance measurement indicator (DMI), odometer measurement data, inertial measurement unit (IMU) data, among other types of position, orientation, velocity, or acceleration data to determine these parameters. In some examples, the machines utilize radar sensors, sonar sensors, lidar sensors, infrared (IR) and non-IR cameras, and other similar sensors to help guide the machines safely and efficiently along different kinds of terrain and move the components of the machine. Some machines have attempted to fuse these different types of data.

An example system for use in fusing data for consumption by a machine controller of a machine is described in U.S. Pat. No. 10,401,176 B2 (hereinafter referred to as the '176 reference). In particular, the '176 reference describes a system and method of determining a real time state of a machine. The method of the '176 reference includes receiving acceleration and angular rate of motion measurements from IMUs mounted on components of a machine and fusing signals received from the IMUs with a separate, machine level Kalman filter module by combining an acceleration measurement and an angular rate of motion measurement from each IMU to estimate an output joint angle for the component on which the IMU is mounted. Estimated and measured values of the output joint angle for each component are combined, a kinematic equation is solved to determine a real time value for at least one of position, velocity, or acceleration of the component at successive time periods, and the determined real time values are applied to control movement of each component.

The '176 reference does not, however, describe fusing data obtained from a first IMU with data obtained by a plurality of additional IMUs to obtain more accurate data. Further, the '176 reference does not describe coupling a plurality of IMUs via a communication bus to allow for data obtained from a first IMU to be provided to all other IMUs coupled to the communication bus and visa versa. Still further, the '176 reference does not describe fusing data obtained from one IMU with data obtained from a different type of sensor. The ability to fuse data from other IMUs and other types of sensor devices allows for a more accurate determination of a pose and state of the machine. Even still further, the '176 reference does not describe fusing data from a first IMU with data from a second IMU in a programmed series order where the data from all the IMUs within the mesh network are able to obtain data from all other IMUs to fuse data as described herein.

Examples of the present disclosure are directed toward overcoming the deficiencies described above.

SUMMARY

In an example of the present disclosure, a method of controlling movement of a machine may include receiving, from a plurality of IMU modules mounted on a corresponding plurality of components of the machine, a plurality of signals indicative of orientation measurements and motion measurements for the components of the machine on which the plurality of IMU modules are mounted. The IMU modules include a corresponding number of state estimators and form a mesh network communicatively coupled to a communication bus. The method may also include, with a first state estimator of a first IMU module, fusing the signals received from separate IMU modules, determining estimates of output orientation data and output motion data for the components of the machine with respect to the components of the machine and in reference to a machine reference frame based on the fused signals, determining a real time value for at least one of position, velocity, or acceleration of the components of the machine based on a kinematic evaluation using the output orientation data and output motion data for the components of the machine, and applying the determined real time value in an implementation of a controlled operational movement of the components of the machine.

In another example of the present disclosure, a system to control movement of a machine may include a plurality of IMU modules mounted on a corresponding plurality of components of the machine. The IMU modules may include an IMU, a processing device, and a state estimator. A communication bus may communicatively couple the IMU modules to one another. The IMU modules receive a plurality of signals indicative of orientation measurements and motion measurements for the components of the machine on which the IMU modules are mounted, and determine output orientation data and output motion data for the components of the machine based on fused orientation measurements and motion measurements for the components of the machine on which the plurality of IMUs are mounted. The IMU modules may also determine a real time value for at least one of position, velocity, or acceleration of the components of the machine based on the output orientation data and output motion data for the components of the machine, and control movement of the components of the machine based on the real time value.

In yet another example of the present disclosure, a non-transitory computer readable medium to control movement of a machine may include computer-usable program code embodied therewith. The computer-usable program code may, when executed by a processor, receive, from a plurality of inertial measurement unit (IMU) modules mounted on a corresponding plurality of components of the machine, a plurality of signals indicative of orientation measurements and motion measurements for the components of the machine on which the plurality of IMU modules are mounted, the IMU modules forming a mesh network communicatively coupled to a communication bus. The orientation measurements and the motion measurements received from the IMU modules may be fused. The computer usable program code may also, when executed by the processor, determine estimates of output orientation data and output motion data for the components of the machine with respect to the components of the machine and in reference to a machine reference frame based on the fused signals. Further, the computer usable program code may also, when executed by the processor, determine a real time value for at least one of position, velocity, or acceleration of the components of the machine based on a kinematic evaluation using the output orientation data and the output motion data for the components of the machine.

DETAILED DESCRIPTION

Figure 1:
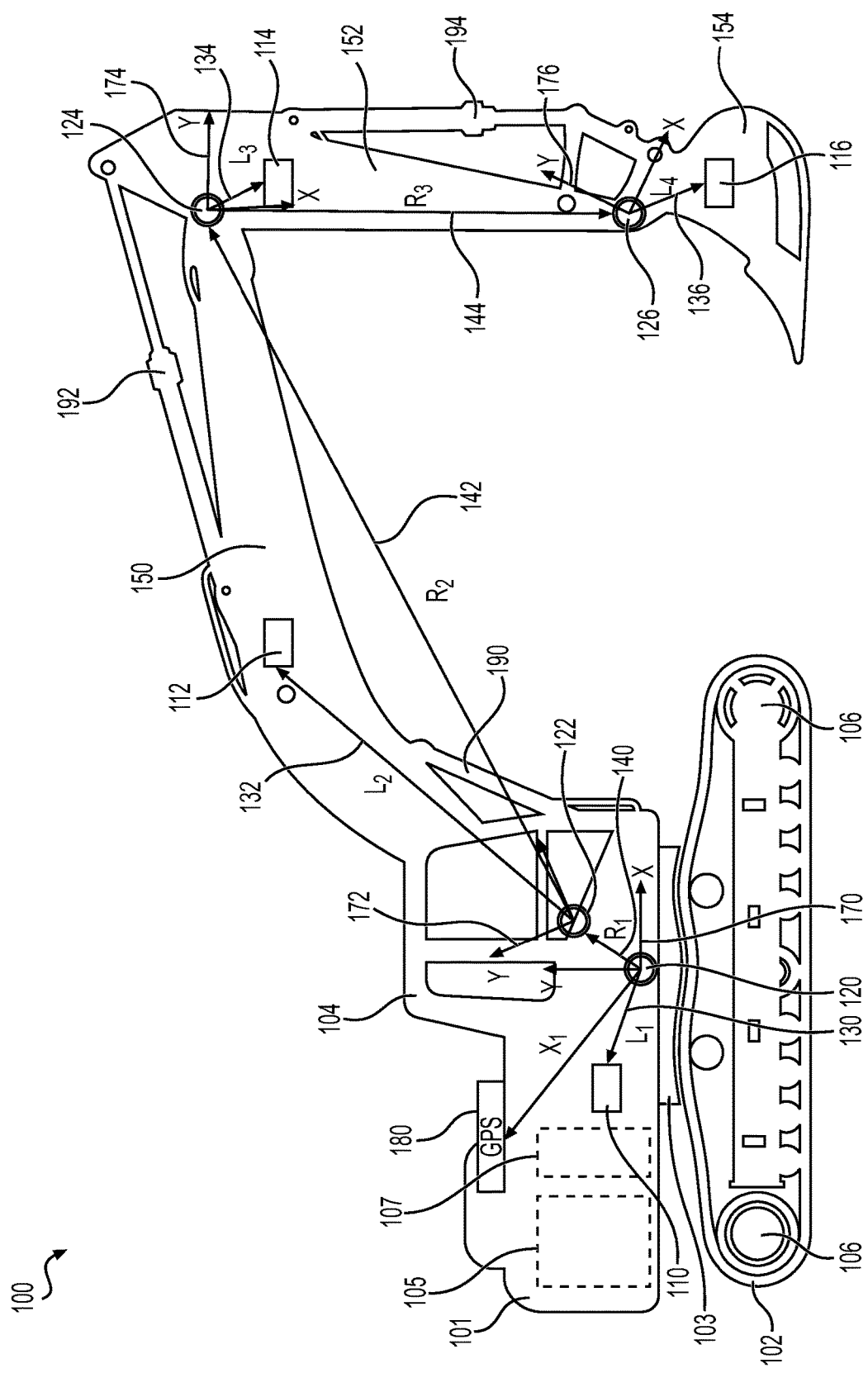
FIG. 1 is a schematic illustration of a system, according to an example of the principles described herein.

Wherever possible, the same reference numbers will be used throughout the drawings to refer to the same or like parts. Referring to FIG. 1, a schematic illustration of a system 100, according to an example of the principles described herein is presented. The system 100 includes a machine 101. In the example of FIG. 1, the machine 101 is an excavator. In other examples, the machine 101 may include, for example, a dozer, a grader, a wheel loader, a wheel tractor scraper, a dump truck, a cement truck, or other type of machine (e.g., heavy equipment and/or other type of vehicle) used to perform a variety of tasks.

The machine 101 may include traction devices 102 used to move the machine 101 around a work area. In another example, a number of wheels may be included in place of the traction devices 102. The machine 101 may also include a body 104. The body 104 may include a cabin in which an operator of the machine 101 may sit and control the various movements of the machine 101. The body 104 may also include an engine 105 and a hydraulic plant 107 for use in moving the machine 101 and/or the components of the machine 101. In one example, the engine 105 is mechanically coupled to the hydraulic plant 107 to provide power to the hydraulic plant 107. Thus, in one example, power provided by the engine 105 may be used by three hydraulic pumps within the hydraulic plant 107. In this example, two of the pumps may supply hydraulic oil at high pressure (e.g., up to about 5000 psi, 345 bar) to control a hydraulic swivel 103 used to turn the body 104 relative to the traction devices 102, track motors 106 used to move the traction devices 102, and various hydraulic pistons 190, 192, 194 used to move a boom 150, a stick 152, a bucket 154, and other components of the machine 101 relative to one another and/or to the body 104 of the machine 101. A third hydraulic pump of the hydraulic plant 107 may include a lower pressure (e.g., about 700 psi, 48 bar) pump for pilot control of spool valves associated with in-cabin controls of the machine 101. This third hydraulic pump allows for reduced physical effort when operating the in-cabin controls.

As depicted in FIG. 1, a number of joints 120, 122, 124, 126 may mechanically couple elements of the machine 101. A first joint 120 may be used to rotatably couple a chassis and/or the traction devices 102 to the body 104. A second joint 122 may be used to rotatably couple the body 104 to the boom 150. Further, a third joint 124 may be used to rotatably couple the boom 150 to the stick 152. Further, a fourth joint 126 may be used to rotatably couple the stick 152 to the bucket 154. The joints 120, 122, 124, 126 are any mechanical coupling that allows the boom 150, the stick 152, and the bucket 154 to articulate with respect to one another and the body 104. The hydraulic pistons 190, 192, 194 may be controlled by the machine 101 to cause the boom 150, the stick 152, and the bucket 154 to articulate with respect to one another and the body 104.

FIG. 1 also illustrates a first coordinate indicator 172 associated with the second joint 122, a second coordinate indicator 174 associated with the third joint 124, and a third coordinate indicator 176 associated with the fourth joint 126. Herein, the first coordinate indicator 172, the second coordinate indicator 174, and the third coordinate indicator 176 may be referred to, collectively, as the coordinate indicators 172, 174, 176. The coordinate indicators 172, 174, 176 may be used to demonstrate an orientation of the respective joints 122, 124, 126 relative to the first joint 120 and with respect to an original orientation or global reference frame 170 of the body 104 (e.g., the origin 170). The coordinate indicators 172, 174, 176 are depicted to demonstrate how the joints 122, 124, 126 are oriented with respect to the joint 120 that couples the body 104 to the hydraulic swivel 103 and which may act as the origin 170 of the machine 101. Throughout the description, the orientations of the coordinate indicators 172, 174, 176 may be determined using IMU modules 110, 112, 114, 116.

A first IMU module 110 may be coupled to the body 104 of the machine. A second IMU module 112, may be coupled to the boom 104. A third IMU module 114 may be coupled to the stick 152. Further, a fourth IMU module 116 may be coupled to the plurality of IMU modules 110, 112, 114, 116. The body 104, the boom 150, the stick 152, the bucket 154, and other elements of the machine 101 are referred to herein as "components." The IMU modules 110, 112, 114, 116 are described in more detail herein and may be any device capable of detecting the pose and state of one of the machine components 104, 150, 152, 154 to which it is coupled. Further, the IMU modules 110, 112, 114, 116 are capable of fusing data representing position, orientation, velocity, and/ or acceleration in space of the components 104, 150, 152, 154. As described in more detail herein, fusing data includes the process of combining sensor data and/or data derived from disparate sources to generate output data characterized by less uncertainty. Further, the IMU modules 110, 112, 114, 116 may be communicatively coupled to one another within a mesh network via a communication bus as described in more detail herein.

The IMU modules 110, 112, 114, 116 may be located on any portion of their respective components 104, 150, 152, 154. The coordinates of the location of the IMU modules 110, 112, 114, 116 on their respective components 104, 150, 152, 154 may be based on a measured vector (e.g., distance and direction) from a joint 120, 122, 124, 126 of that respective component 104, 150, 152, 154. As described herein, the state estimators are provided coordinates (e.g., x,y,z coordinates in three dimensional space) of the IMU modules 110, 112, 114, 116 in the frame of the respective components 104, 150, 152, 154 in order to determine the position of the components 104, 150, 152, 154 with respect to each other. In the example of FIG. 1, a first vector $L_1$ between the joint 120 and the location of the IMU module 110 may define first coordinates offset from the first joint 120 as indicated by line 130 of the IMU module 110. Likewise, a second vector $L_2$ between the joint 122 and the location of the IMU module 112 may define second coordinates offset from the second joint 122 as indicated by line 132 of the IMU module 112. Similarly, a third vector $L_3$ between the joint 124 and the location of the IMU module 114 may define third coordinates offset from the third joint 120 as indicated by line 134 of the IMU module 114. Further, a fourth vector $L_4$ between the joint 126 and the location of the IMU module 116 may define fourth coordinates offset from the fourth joint 126 as indicated by line 136 of the IMU module 116. Any number of additional coordinates of an IMU module coupled to a component 104, 150, 152, 154 of the machine 101 may be determined based on the distance from that IMU module and a joint associated with that component. IMU modules may be placed on any other portion or component 104, 150, 152, 154 of the machine 101 including, for example, the joints 120, 122, 124, 126, the hydraulic swivel 103, the hydraulic pistons 190, 192, 194, and the traction devices 102, among other locations.

The system 100 may also include sensors in addition to the IMU modules 110, 112, 114, 116 that collect and send additional data to the IMU modules 110, 112, 114, 116 for fusing of the data as described herein. The additional sensors may include any type of device that measures position, orientation, velocity, acceleration, an angle relative to a plane such as a gravitational plane, motion, and/or other parameters of the machine 101 and its components 104, 150, 152, 154. The additional sensors may include, for example, a GPS device 180 to gather geolocation data of the machine 101. Further, the additional sensors may include, for example, an additional IMU, a rotary potentiometer, a radar device, a global navigation satellite system (GNSS) device, a distance measurement indicator (DMI), and odometer, a sonar device, a lidar device, an altimeter, a gyroscope, an inertial navigation system, an inertial reference unit, a magnetic compass, a magnetohydrodynamic sensor, a vibrating structure gyroscope, a microelectromechanical systems (MEMS) gyroscope, a yaw-rate sensor, a gravimeter, an accelerometer, an inclinometer, a laser surface velocimeter, a rotary encoder, a rotary variable differential transformer (RVDT), a synchro, an infrared (IR) camera, a non-IR camera, other devices, and/or combinations thereof.

Locations of elements within the machine 101 may be defined using body coordinates. For example, a first location of the body 104 may also be referred to as a body origin of the machine 101 and the body 104 of the machine, and is the location of the first joint 120. Thus, the body origin is defined by the distance and direction $L_1$ from the first IMU module 110 to the first joint 120. A second body origin of the boom 150 is the location of the joint 122 and may be defined by a first distance and direction $R_1$ 140 from the body origin (e.g., from the first joint 120). Similarly, a second body origin of the stick 152 and location of the joint 124 may be defined by a second distance and direction $R_2$ 142 from the body origin of the boom 150 (e.g., from the second joint 122). Likewise, a third body origin of the bucket 154 is the location of joint 126 and may be defined by a third distance and location $R_3$ 144 from the body origin of the stick 152 (e.g., from the joint 124). This data may be determined and stored within memory of the machine controller 201 or other data storage device to provide a basis from which the coordinates of the components 102, 103, 104, 150, 152, 154, 190, 192, 194 and other elements of the machine 101 are determined.

Figure 2:
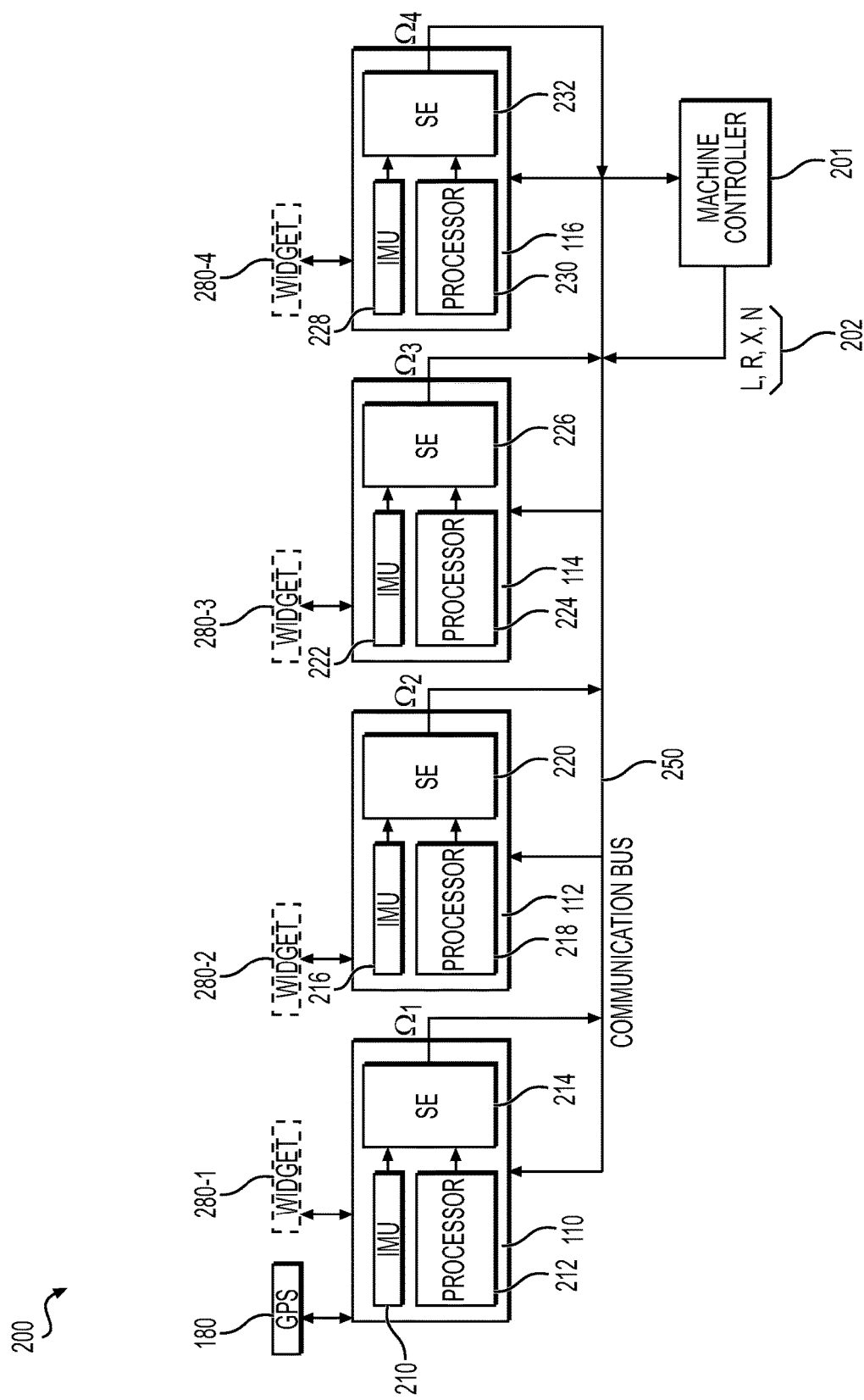
FIG. 2 is a schematic illustration of a mesh network of IMU modules associated with the system of FIG. 1, according to an example of the principles described herein.

The system 100 of FIG. 1 will be described in connection with the remaining figures. FIG. 2 is a schematic illustration of a mesh network 200 of the IMU modules 110, 112, 114, 116 associated with the system 100 of FIG. 1, according to an example of the principles described herein. The first IMU module 110 includes a first IMU 210, the second IMU module 112 includes a second IMU 216, a third IMU module includes a third IMU 222, and a fourth IMU module 116 may include a fourth IMU 228. The first IMU 210, the second IMU 216, the third IMU 222, and the fourth IMU 228 are referred to herein as "IMUs" 210, 216, 222, 228. The IMUs 210, 216, 222, 228 may include any device or combination (s) of devices that measure at least one of a pose or a state of the machine 101 and/or of pose and/or state of the individual components 104, 150, 152, 154. For example, the IMUs 210, 216, 222, 228 may use a combination of accelerometers, gyroscopes, magnetometers and other measuring devices to obtain measurements that define the pose and/or state of the machine 101 and the components 104, 150, 152, 154.

The first IMU module 110 includes a first processor 212, the second IMU module 112 includes a second processor 218, the third IMU module 114 includes a third processor 224, and the fourth IMU module 116 includes a fourth processor 230. The first processor 212, the second processor 218, the third processor 224, and the fourth processor 230 are referred to herein as "processors" 212, 218, 224, 230. The processors 212, 218, 224, 230 may play any role in the processing of data described in connection with the systems and methods described herein. The processors 212, 218, 224, 230 may include hardware architecture to retrieve executable code from a data storage device and execute the executable code. The executable code may, when executed by the processor 212, 218, 224, 230, cause the processor 212, 218, 224, 230 to implement at least the functionality of the systems and methods described herein. In the course of executing code, the processor 212, 218, 224, 230 may receive input from and provide output to a number of the remaining hardware units.

The first IMU module 110 includes a first state estimator (SE) 214, the second IMU module 112 includes a second SE 220, the third IMU module 114 includes a third SE 226, and the fourth IMU module 116 includes a fourth SE 232. The first SE 214, the second SE 220, the third SE 226, and the fourth SE 232 are referred to herein as "SEs" 214, 220, 226, 232. The SE 214, 220, 226, 232 may be any data processing device that provides an estimate of a state of the system 100 including the machine 101 and its components 104, 150, 152, 154 based on measurements obtained from a number of sensors. As defined herein, the "state" of the machine includes the pose of the machine as well as various additional operating parameters that may be used to model the kinematics and dynamics of the machine, such as parameters characterizing the various links, joints, tools, hydraulics, and power systems of the machine. The various links, joints, tools, hydraulics, and power systems of the machine 101 include the components 104, 150, 152, 154, the joints 120, 122, 124, 126, the hydraulic pistons 190, 192, 194, the engine 105, and the hydraulic plant 107, among other elements of the machine 101.

The SE 214, 220, 226, 232 may, in some examples, execute a filtering algorithm. For example, a Kalman filter may be configured to implement a linear quadratic estimation (LQE) processes including sensor fusion performed in a sensor fusion module. The Kalman filter may also be configured to perform gyroscope bias estimation in a gyroscope bias estimation module in order to compensate for any drift over time in the readings provided by gyroscopes associated with the IMUs. Although the application of a Kalman filter is described herein, other filters and associated algorithms and processes may be executed. The SE 214, 220, 226, 232 may receive input data that has been transformed into a common set of inputs. A number of angles, rates, velocities, and positions of the machine 101 and/or any number of components 104, 150, 152, 154 and other components of the machine 101 may be the output of the SE 214, 220, 226, 232 as described in more detail herein.

In one example, a location device such as the GPS device 180 may receive a GPS signal as the location signal indicative of the location of the machine 101 and provide the received location signal to the SEs 214, 220, 226, 232 for further processing. The Kalman filter may also be configured to filter noisy measurements, such as the measurements received as signals from the plurality of IMUs 210, 216, 222, 228 and non-IMU sensors mounted on the different components 104, 150, 152, 154 of the machine 101, to estimate desired signals. The non-IMU sensors may include the GPS device 180 and other sensors described herein. The estimates derived by the Kalman filter from the signals provided by the IMUs 210, 216, 222, 228 and non-IMU sensors may be statistically optimal in the sense that they minimize the mean-square estimation error of the signals. The state uncertainty estimate for the noisy measurements may be determined as a covariance matrix, where each diagonal term of the covariance matrix is the variance or uncertainty of a scalar random variable. Additional functionality of the SEs 214, 220, 226, 232 and the Kalman filters is described herein.

The GPS device 180 and other non-IMU sensors (indicated as "widgets" in FIG. 2) 280-1, 280-2, 280-3, 280-4 sense the state and pose of the machine 101 and the components 104, 150, 152, 154 of the machine 101. A first non-IMU sensor 280-1 may be associated with and communicatively coupled to the first IMU module 110, the second non-IMU sensor 280-2 may be associated with and communicatively coupled to the second IMU module 112, the third non-IMU sensor 280-3 may be associated with and communicatively coupled to the third IMU module 114, and the fourth non-IMU sensor 280-4 may be associated with and communicatively coupled to the fourth IMU module 116. The non-IMU sensors 280-1, 280-2, 280-3, 280-4 are indicated in the figures as "widgets" because these non-IMU sensors 280-1, 280-2, 280-3, 280-4 may be any device capable of sensing any environmental state of the machine including sensing the pose and/or state of the machine 101 and any of the component 104, 150, 152, 154 of the machine 101. The non-IMU sensors 280-1, 280-2, 280-3, 280-4 may sense the same, similar, or different types of measurements relative to the IMUs 210, 216, 222, 228 of the IMU modules 110, 112, 114, 116. The non-IMU sensors 280-1, 280-2, 280-3, 280-4 may include, for example, a rotary potentiometer, a radar device, a global navigation satellite system (GNSS) device, a distance measurement indicator (DMI), and odometer, a sonar device, a lidar device, an altimeter, a gyroscope, an inertial navigation system, an inertial reference unit, a magnetic compass, a magnetohydrodynamic sensor, a vibrating structure gyroscope, a microelectromechanical systems (MEMS) gyroscope, a yaw-rate sensor, a gravimeter, an accelerometer, an inclinometer, a laser surface velocimeter, a rotary encoder, a rotary variable differential transformer (RVDT), a synchro, an infrared (IR) camera, a non-IR camera, other devices, and/or combinations thereof.

The sensed measurements may be transmitted to the IMU modules 110, 112, 114, 116 as data inputs to the processors 212, 218, 224, 230, and/or the SEs 214, 220, 226, 232. The GPS device 180 and other non-IMU sensors 280-1, 280-2, 280-3, 280-4 may sense and/or transmit data to the IMU modules 110, 112, 114, 116 at any number of time intervals or may push sensed data to the IMU modules 110, 112, 114, 116 as a change in the state or pose of the machine 101 is detected.

Each of the IMU modules 110, 112, 114, 116 may also include a data storage device (not shown) as a separate element and/or as an embedded device within the IMU 210, 216, 222, 228, the processor 212, 218, 224, 230, and/or the SEs 214, 220, 226, 232. The data storage device may store data such as executable program code that is executed by the processors 212, 218, 224, 230, the SEs 214, 220, 226, 232, and/or other data processing devices. As will be discussed, the data storage device may specifically store computer code representing a number of applications that the processors 212, 218, 224, 230, the SEs 214, 220, 226, 232, and/or other data processing devices execute to implement at least the functionality described herein. The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs.

The data storage device may include a computer readable medium, a computer readable storage medium, or a non-transitory computer readable medium, among others. For example, the data storage device may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that may contain, or store computer usable program code for use by or in connection with an instruction execution system, apparatus, or device. In another example, a computer readable storage medium may be any non-transitory medium that may contain or store a program for use by or in connection with an instruction execution system, apparatus, or device.

Each IMU module 110, 112, 114, 116 outputs data in the form of processed orientation data and motion data for the respective components 104, 150, 152, 154 of the machine 101 on which the IMU modules 110, 112, 114, 116 are located. The first IMU module 110 provides a first output $\Omega_1$ of processed orientation data and motion data associated with the body 104 of the machine 101. The second IMU module 112 provides a second output $\Omega_2$ of processed orientation data and motion data associated with the boom 150 of the machine 101. The third IMU module 114 provides a third output $\Omega_3$ of processed orientation data and motion data associated with the stick 152 of the machine 101. The fourth IMU module 116 provides a fourth output $\Omega_4$ of processed orientation data and motion data associated with the bucket 154 of the machine 101. The first output $\Omega_1$, the second output $\Omega_2$, the third output $\Omega_3$, and the fourth output $\Omega_4$ are referred to herein as "outputs" $\Omega_1$, $\Omega_2$, $\Omega_3$, $\Omega_4$. Outputs $\Omega_1$, $\Omega_2$, $\Omega_3$, $\Omega_4$ may be transmitted from the respective IMU modules 110, 112, 114, 116 to a communication bus 250. The data transmitted from a first of the IMU modules 110, 112, 114, 116 to another of the IMU modules 110, 112, 114, 116 and/or to the machine controller 201 may be sent via the communication bus 250. In this manner, the IMU modules 110, 112, 114, 116 and the machine controller 201 form a mesh network 200. The mesh network 200 may be any network topology in which the IMU modules 110, 112, 114, 116 and the machine controller 201 act as nodes. Also, in the mesh network, each node is connected directly, dynamically, and non-hierarchically, to all other nodes in the network. In this manner, the IMU modules 110, 112, 114, 116 and the machine controller 201 may relay information to all other nodes within the mesh network 200. Although four IMU modules 110, 112, 114, 116 are depicted in FIG. 2 along with the machine controller 201, any number of IMU modules 110, 112, 114, 116 may be included within the mesh network 200. Further, in one example, the GPS device 180 and/or the non-IMU sensors 280-1, 280-2, 280-3, 280-4 may also form part of the mesh network 200 and share obtained pose and/or state data with any node within the mesh network 200.

The machine controller 201 may include any processing device that controls electrical and/or mechanical systems or subsystems associated with the machine 101. For simplicity in description, one machine controller 201 is depicted and described herein, although the machine 101 can include a plurality of machine controllers. The machine controller 201 may include an electronic control unit (ECU) such as, for example, an electronic control module (ECM), a powertrain control module (PCM), a transmission control module (TCM), an electronic brake control module (EBCM), a central control module (CCM), a central timing module (CTM), a general electronic module (GEM), a body control module (BCM), a suspension control module (SCM), and a control unit, other types of ECUs and combinations thereof. The ECUs may include hardware and embedded software that assist in the operation of the machine 101. In one example, the machine controller 201 may enable autonomous and/or semi-autonomous control of the machine 101. The machine 101 may include actuators electromechanically coupled to the traction devices 102, the machine body 104, the boom 150, the stick 152, the bucket 154 (i.e., work tool), and other moving elements of the machine 101. The actuators may be communicatively coupled to the machine controller 201, and, via the actuators, the machine controller 201 may instruct the actuators to move and control the track motors 106, the traction devices 102, the machine body 104, the boom 150, the stick 152, the bucket 154, the hydraulic swivel 103, the hydraulic pistons 190, 192, 194, and other moving elements of the machine 101.

The machine controller 201 may also include a data storage device as described herein to store computer code the machine controller 201 accesses and executes to bring about the functionality of the machine controller 201. For example, the machine controller 201, as part of the system 100, controls the components 102, 103, 104, 150, 152, 154, 190, 192, 194 and other elements of the machine 101. Still further, the machine controller 201 may store data related to a number of machine state parameters 202 that that may be used to model the kinematics and dynamics of the machine 101, such as parameters characterizing the various links, joints, tools, hydraulics, and power systems of the machine and their coordinate locations within the machine 101. In one example, the machine controller 201 may control the machine and configure the IMU modules, including calibration of lever arms.

For example, machine state parameters 202 used by the machine controller 201, the IMU modules 110, 112, 114, 116, and/or other processing device may include stored data related to the first vector $L_1$, the second vector $L_2$, the third vector $L_3$, and the fourth vector $L_4$. The machine controller 201, the IMU modules 110, 112, 114, 116, and/or other processing device uses the machine state parameters 202 to define coordinate locations of the joints 120, 122, 124, 126, the IMU modules 110, 112, 114, 116, and other elements located on the machine 101 to assist in determining the pose and/or state of the machine 101. The coordinate locations of the IMU modules 110, 112, 114, 116 from respective joints 120, 122, 124, 126 is defined by the first vector $L_1$, the second vector $L_2$, the third vector $L_3$, and the fourth vector $L_4$. This data may be determined and stored within memory of the machine controller 201. The machine controller 201 and/or the IMU modules 110, 112, 114, 116 may use the stored machine state parameters 202 to determine a basis from which the coordinates of the components 102, 103, 104, 150, 152, 154, 190, 192, 194 and other elements of the machine 101 are determined. For example, the machine controller 201 and/or the IMU module 110, 112, 114, 116 may use the first vector $L_1$ to determine where the first IMU module 110 is located on the body 104. The position data of the first IMU module 110 may serve as an origin or initial position for use in subsequent processing when the position of the first IMU 110 on the body 104 is part of the processing associated with inputs to the Kalman filter.

Further, the machine state parameters 202 used by the machine controller 201 may include stored data related to coordinate locations of the body 104 relative to a first joint 120 as defined by the global reference frame 170. For example, a second location of the joint 122 may be defined by a first distance and direction $R_1$ 140 based on a distance and location from joint 120. The first distance and direction $R_1$ 140 may be defined by a location of the second joint 122 (e.g., the next body origin in body coordinates). Similarly, a third location of the joint 124 may be defined by a second distance and direction $R_2$ 142 based on a distance and location from joint 122. Likewise, a fourth location of joint 126 may be defined by a third distance and direction $R_3$ 144 based on a distance and location from joint 124. This data may be determined and stored within memory of the machine controller 201 to provide a basis from which the coordinates of the components 102, 103, 104, 150, 152, 154, 190, 192, 194 and other elements of the machine 101 are determined.

Further, the machine state parameters 202 used by the machine controller 201, the IMU modules 110, 112, 114, 116, and/or other processing device to determine and store data defining a location of the body 104 (i.e., position of the machine 101), a speed at which the body 104 is moving (i.e., a velocity of the machine 101), a coordinate direction of movement of the body 104 (i.e., the direction the machine 101 is moving), acceleration of the body 104 of the machine 101. For example, the machine controller 201 can use the location, speed, direction, and/or. The GPS device 180 may be offset from a center of the machine 101 such as joint 120 or another origin by a distance defined by $X_1$.

The machine controller 201 may also store data in an associated data storage device defining a mesh node order. The mesh node order may define the order by which the machine controller 201 instructs the IMU modules 110, 112, 114, 116 to provide their respective outputs $\Omega_1$, $\Omega_2$, $\Omega_3$, $\Omega_4$ to other of the IMU modules 110, 112, 114, 116 and/or the machine controller 201. The outputs $\Omega_1$, $\Omega_2$, $\Omega_3$, $\Omega_4$ may include, for example, a number of angles, rates, velocities, and positions of the machine 101 and/or any number of components 104, 150, 152, 154 and other components of the machine 101 may be the output of the SEs 214, 220, 226, 232 of the IMU modules 110, 112, 114, 116. The mesh node order provides for the IMU modules 110, 112, 114, 116 to perform their data processing defined herein in series, and the machine controller 201 programs or defines the mesh node order. For example, the machine controller 201 may define that the first IMU module 110 is to process its data and provide its output $\Omega_1$ to the remaining IMU modules 112, 114, 116 and the machine controller 201 via the communication bus 250. The machine controller 201, for any number of reasons and on any basis, may define that the third IMU module 114 is the next within the mesh node order to process its data and provide its output $\Omega_3$ to the remaining IMU modules 110, 112, 116 and the machine controller 201 via the communication bus 250. Thereafter, the second IMU module 112 and the fourth IMU module 116 may be assigned by the machine controller 201 as the next two IMU modules in the series as defined by the mesh node order. In one example, two or more IMU modules 110, 112, 114, 116 may perform their respective data processing in parallel. In these examples, the machine controller 201 programs the series, mesh node order. The mesh node order may be adjusted or changed based on the location of the IMU modules 110, 112, 114, 116, a priority of which component 104, 150, 152, 154 is to be analyzed using the outputs of other IMU modules 110, 112, 114, 116 from the other components 104, 150, 152, 154, user preference, and other reasons to allow for the data analyzed and fused by the IMU modules 110, 112, 114, 116 as effectively and efficiently as possible.

In the examples described herein, the machine controller 201, the processors 212, 218, 224, 230, and/or the SEs 214, 220, 226, 232 of each IMU module 110, 112, 114, 116 may work together to process the data obtained from the sensors described herein. In this example, the machine controller 201, the processors 212, 218, 224, 230, and the SEs 214, 220, 226, 232 may transmit data between one another as they execute the processing and methods described herein.

The mesh network 200 provided by the machine controller 201, the IMU modules 110, 112, 114, 116 and the communication bus 250 allows for the leveraging of information obtained from other IMU modules 110, 112, 114, 116, the GPS device 180, and sensors 280-1, 280-2, 280-3, 280-4 to be leveraged. In the example of FIG. 2, the GPS device 180 and the non-IMU sensors 280-1, 280-2, 280-3, 280-4 are connected to the IMU modules 110, 112, 114, 116. In one example, the GPS device 180 and/or the non-IMU sensors 280-1, 280-2, 280-3, 280-4 may also form part of the mesh network 200 and share obtained pose and/or state data with any node within the mesh network 200. In this example, the measurements sensed by the GPS device 180 and/or the non-IMU sensors 280-1, 280-2, 280-3, 280-4 may be sent directly to the IMU modules 110, 112, 114, 116 for fusion with other data sets as described herein. The additional sensor measurements from these nodes within the mesh network 200 may be mathematically fused to obtain more accurate measurements that may otherwise include systematic errors, noise, or other undesirable qualities. The fusion of the data is performed by execution of a Kalman filter as described herein.

Figure 3:
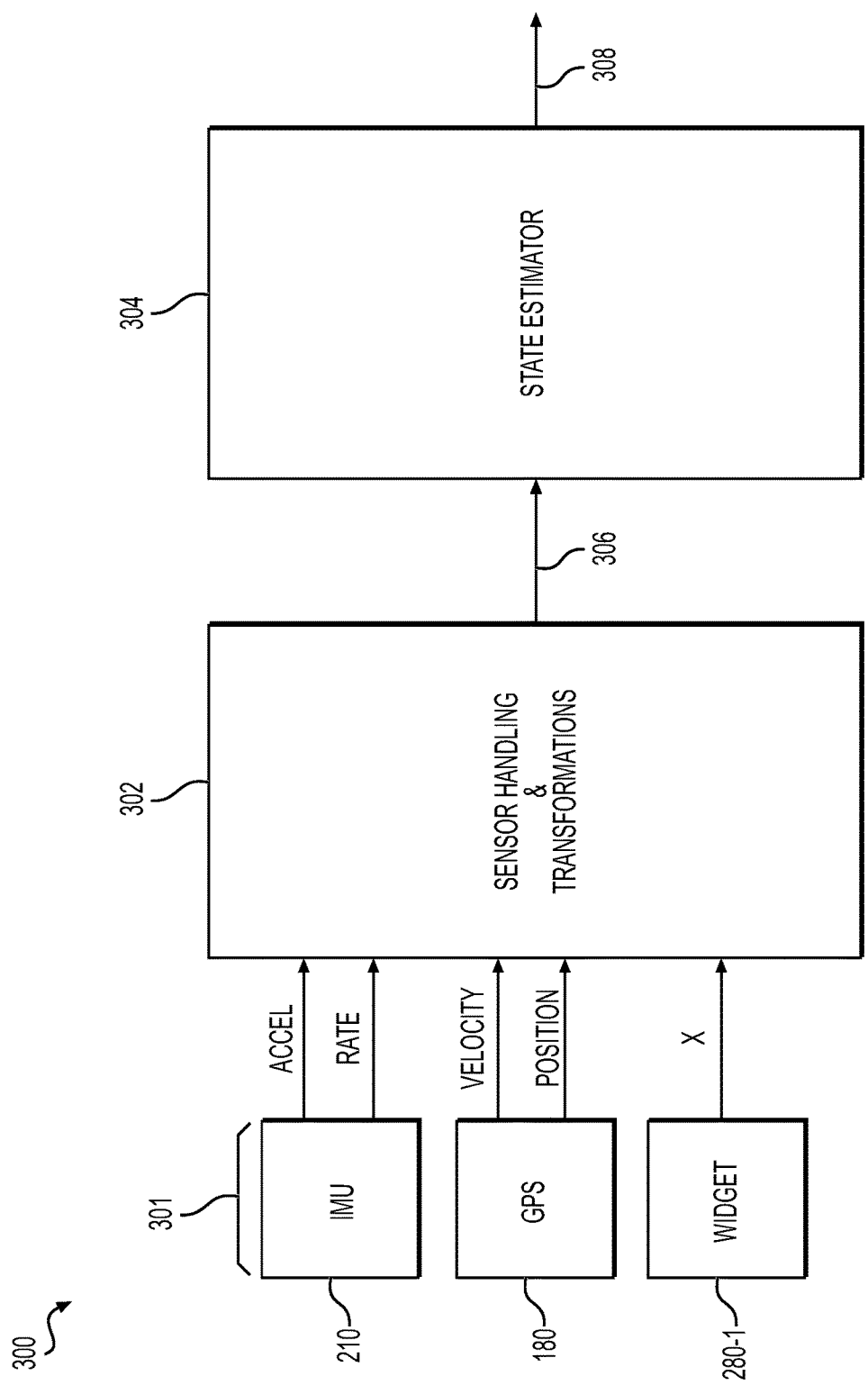
FIG. 3 is a schematic illustration of an IMU module, according to an example of the principles described herein.

FIG. 3 is a schematic illustration of an IMU module 300, according to an example of the principles described herein. The IMU module 300 of FIG. 3 may be any one of the IMU modules 110, 112, 114, 116 depicted in FIGS. 1 and 2. At 301, a number of inputs including data obtained by an IMU 210, data obtained by a GPS device 180, and data obtained by another non-IMU sensor 280-1 (indicated as "widget" in FIG. 3). In the example of FIG. 3, the GPS device 180, and the non-IMU sensor 280-1 is depicted as providing input to block 302 and not necessarily as a part of the IMU module 300. However, in the examples described herein, the GPS device 180, and the non-IMU sensors 280-1, 280-2, 280-3, 280-4 may be integrated into the IMU modules 110, 112, 114, 116 or may be separate entities that are communicatively coupled to the IMU modules 110, 112, 114, 116. The data sensed and generated by the IMU 210 may include, for example, acceleration and rate measurements of the component 104, 150, 152, 154 of the machine 101 as identified by a respective IMU module 110. Other pose and state data may be obtained by the IMU 210 including the examples of sensor measurement data described herein.

The GPS device 180 senses a position and a velocity of the machine 101 and/or the component 104, 150, 152, 154 of the machine 101 to which the GPS device 180 is coupled. In one example, the GPS device 180 may be the GPS device 180 depicted in FIGS. 1 and 2 where the GPS device 180 is external to the IMU 210. In another example, the GPS device 180 of FIG. 3 may be an integrated device, e.g., within the IMU module in which the IMU 210 resides. Any number of GPS devices may be coupled to any portion of the machine 101 and/or any number of components 104, 150, 152, 154. In the example of FIGS. 1, 2 and 3, the GPS device 180 may be coupled to the body 104 of the machine 101. GPS data may be obtained for any other portion of the machine 101. The additional sensor 280-1 may provide any additional measurements of the pose and/or state of the machine 101 and/or any number of components 104, 150, 152, 154 as designated by "X" leading from the additional sensor 280-1 in FIG. 3.

At 302, the processor 212, 218, 224, 230, an SE 214, 220, 226, 232, and/or the machine controller 201 may handle the various types of data obtained from the IMU 210, the GPS device 180, and/or the additional sensor 280-1 to transform that input data into a common set of inputs. The common set of inputs may be output via line 306 to the SE 304. The SE 304 in FIG. 3 may be any of the SEs 214, 220, 226, 232 depicted in FIG. 2. The SE 304 applies a Kalman filter to the output of 302 to obtain angles, rates, velocities, and positions of the machine 101 and/or any number of components 104, 150, 152, 154 and other components of the machine 101 via line 308. The output of the SE 304 may be to the machine controller 201, and the machine controller 201 may use this processed data to control the machine 101 and any number of the components 104, 150, 152, 154. More details regarding the processes outlined in FIG. 3 will now be described in connection with FIG. 4 including the collection and fusion of data via a Kalman filter 440.

Figure 4:
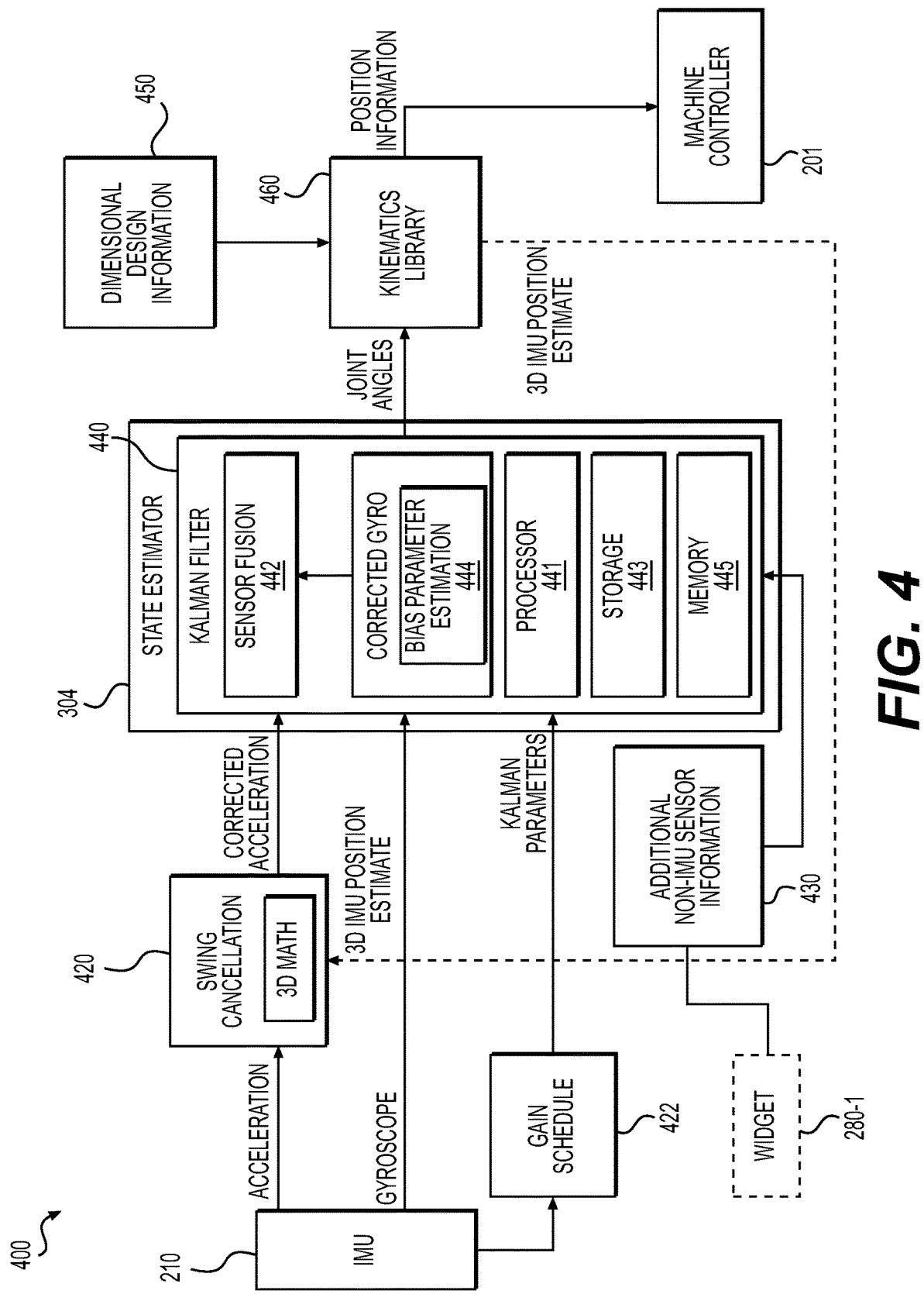
FIG. 4 is a schematic illustration of a sensor fusion system for determining the state of the machine of FIG. 1.

FIG. 4 is a schematic illustration of a sensor fusion system 400 for determining the state of the machine 101 of FIG. 1. The sensor fusion system 400 may be configured to provide accurate, real time outputs to the machine controller 201 configured for controlling various operational aspects of the machine 101. The machine controller 201 may be associated with or an integral part of a machine ECM or similar device. The sensor fusion system 400 may be configured to receive signals from a plurality of IMUs 210, 216, 222, 228 (e.g., such as IMU modules 110, 112, 114, 116 and their respective IMUs 210, 216, 222, 228) and additional non-IMU sensors 280-1, 280-2, 280-3, 280-4, as well as signals indicative of various operator commands, such as signals generated by movement of a joystick by an operator, pedal, steering wheel, or other input device or operator control. The reference to IMU 210 may apply to any of the IMUs 210, 216, 222, 228 described herein, and/or other IMUs not specifically illustrated.

The sensor fusion system is configured to perform sensor fusion. As used herein, "fusion," "sensor fusion" or "data fusion" is the process of combining sensor data and/or data derived from disparate sources to generate output data characterized by less uncertainty. In instances where sensor fusion is not employed, inaccurate and/or imprecise data obtained from sensors or other sources may cause inaccuracies in further processing of that data. In the context of this disclosure, pose and/or state information from the IMU modules 104, 150, 152, 154, position and/or velocity information from the GPS device, and/or data obtained from the non-IMU sensors 280-1, 280-2, 280-3, 280-4 are fused to determine output pose and/or state data that represents an pose and/or state of the machine 101 and the components 104, 150, 152, 154 more accurately than would be possible when fusion of these data sources does not occur. The disparate sources of sensory data or data derived from disparate sources used in the fusion processing described herein may include, for example, sensory data obtained from each of the IMUs 210, 216, 222, 228, the GPS device 180, additional non-IMU sensors 280-1, 280-2, 280-3, 280-4, and other data sources described herein.

The sensor fusion system 400 may also be configured to receive information regarding the dimensional design of the particular machine with which the sensor fusion system 400 is associated. The dimensional design of the machine 101 includes, for example, the physical extents and dimensions of the machine 101 and the IMU modules 104, 150, 152, 154 of the machine 101. A dimensional design information database 450 stores data representing the dimensional design of the machine 101. The dimensional design information database 450 may include data representing the dimensions and structure of the machine 101.

The particular dimensional design information received from the design information database 450 for a particular machine may be used by a processor 441 associated with the sensor fusion system 400. The dimensional design information received from the design information database 450 serves as a starting point for calculating the position of the IMU modules 104, 150, 152, 154 on the machine 101 and the position of the components 104, 150, 152, 154 based on the pose and/or state of the machine 101 as sensed by the IMU modules 104, 150, 152, 154. The dimensional design information received from the design information database 450 may be configured for deriving the kinematics and dynamics of the machine 101 in conjunction with a kinematic library module 460 and/or through the empirical derivation of the kinematics and dynamics using physics-based equations and algorithms. The various sensors and processors may be connected to each other via any suitable architecture, including any combination of wired and/or wireless networks. Additionally, such networks may be integrated into the mesh network 200 or any local area network (LAN), wide area network (WAN), a controller area network (CAN), and/or the Internet.

The IMU modules 110, 112, 114, 116 may be applied to the machine in multiple different positions and orientations, including on different portions of the machine body 104, the boom 150, the stick 152, and the work tool (e.g., the bucket) 154. In one example, the IMU modules 110, 112, 114, 116 are retrofitted at multiple positions and orientations along each of the portions of the machine, and may be added and removed depending on a particular machine application and configuration. Here, retrofitting includes the coupling of the IMU modules 110, 112, 114, 116 and other elements of the system 100 to the machine 101 after manufacturing of the machine 101 is completed. In another example, the machine 101 may be manufactured with the IMU modules 110, 112, 114, 116 and other elements of the system 100. Raw data received from each IMU 210, 216, 222, 228 of the IMU modules 110, 112, 114, 116 may be processed through a Kalman filter 440, as described in more detail herein. In one example, the Kalman filter 440 for each IMU module 110, 112, 114, 116 may be included as part of the IMU modules 110, 112, 114, 116 and/or as part of the SEs 214, 220, 226, 232 as depicted in FIG. 4. In another example, the Kalman filter 440 may be part of a separate sensor fusion module provided as part of a separate sensor fusion system.

Gyroscopes may be included in each of the IMU modules 110, 112, 114, 116 to sense orientation through angular velocity changes, while accelerometers of each IMU modules 110, 112, 114, 116 may sense changes in direction with respect to gravity. The gyroscope measurements tend to drift over time because they only sense changes and have no fixed frame of reference. The addition of accelerometer data allows bias in the gyroscope data to be minimized and better estimated to reduce propagating error and improve orientation readings. The accelerometers may provide data that is more accurate in static calculations, when the system is closer to a fixed reference point, while the gyroscopes are better at detecting orientation when the system is already in motion. Signals indicative of linear acceleration and angular rate of motion received from the accelerometers and gyroscopes of the IMU modules 110, 112, 114, 116 associated with each of the different portions and/or components 104, 150, 152, 154 of the machine 101 may be combined by the Kalman filter(s) to more accurately predict the output angle, velocity, and/or acceleration of each of the separate components of the machine.

The Kalman filter 440 associated with each IMU module 110, 112, 114, 116 mounted on a separate machine component 104, 150, 152, 154 received measured values of the pose and/or state of the machine as detected by the IMUs 210, 216, 222, 228. The Kalman filter 440 may find estimates of future values by varying an averaging factor to optimize the weight assigned to estimated or predicted values as compared to the weight assigned to actual measured values. By performing this varying of the averaging factor, the Kalman filter 440 thereby converges on the best estimates of the true values for output joint angles, velocity, and/or acceleration for each component of the machine. The averaging factor may be weighed by a measure of predicted uncertainty, sometimes called the covariance, to determine a value between the predicted and measured values. The Kalman filter 440 estimates a machine state by using a form of feedback control in a recursive and iterative process, with each iteration including a time update or "predict" phase, and a measurement or "correct phase." During each iteration performed by the Kalman filter 440, a "gain" or weighting is determined by comparing an error in the estimate for a measured value and an error in the actual measurement of the value. The Kalman gain is equal to a ratio between the error in the estimate and the sum of the error in the estimate and the error in the actual measurement. A current estimate for the value is then calculated from the previous estimate and a new measured value. A new error in the estimate of the value is then determined and fed back for use in determining the gain to be applied in the next iteration. The combined or fused information provided by the Kalman filter 440 may provide accurate, real time information on pitch rate, yaw rate, roll rate, boom angle, stick angle, and other angles depending on linkage configuration and the number of IMU modules 110, 112, 114, 116 installed on the different components 104, 150, 152, 154 of the machine 101.

As shown in FIG. 4, a Kalman filter 440 of a sensor fusion system 400 according to this disclosure may be configured to estimate bias of gyroscope information provided by the IMUs 210, 216, 222, 228 of the IMU modules 110, 112, 114, 116, such as the pitch rate, the yaw rate, and the roll rate of each of the components 104, 150, 152, 154. Because the linear positions and angular positions of points on each of the components 104, 150, 152, 154 are calculated by twice integrating linear accelerations and angular rates of motion from the IMUs 210, 216, 222, 228, the calculated information may drift over time, deviating more and more from the actual positions as small errors in the measurements are magnified by the integrations. In one example, the angular rate is integrated and not the linear accelerations. In this example, angular position may be estimated using trigonometric functions and acceleration readings. For example, angle=a tan(acceleration(y)/accelreation(x). The acceleration readings may include non-gravitational components that may be considered and removed prior to this calculation. The estimated angle is fused with the integrated angular rate estimate and any other sensor readings using the Kalman filter 440 and the sensor fusion algorithms described herein. Therefore, the gyroscope biasing aspect of the Kalman filter 440 may increase the accuracy of the joint angles calculated from the information provided by the IMUs 210, 216, 222, 228. The output joint angles for each of the individual components 104, 150, 152, 154 of the machine 101 may be fused with each other at a machine level in order to account for movement of two or more components 104, 150, 152, 154 relative to the machine 101 while the two or more components 104, 150, 152, 154 remain in a fixed orientation relative to each other. For example, both the IMU module 112 and its respective IMU 212 on the boom 150 of the machine 101 illustrated in FIG. 1, and the IMU module 114 and its respective IMU 214 on the stick 152 may indicate a change in output joint angles relative to a machine reference frame 170 and/or a global reference frame when the boom 150 moves upwardly. The actual angle between the boom 150 and the stick 152 may not have changed. Fusing the output joint angles for each of the boom 150 and the stick 152 at a machine level will provide this information so that actual positions of different points on the separate machine components 104, 150, 152, 154 relative to the machine reference frame 170 and a global reference frame may be determined in real time.

As further depicted in FIG. 4, the output joint angles that have been fused at the machine level by the Kalman filter 440 may be received by a kinematic library module 460. The kinematic library module 460 may be configured to receive the output joint angles from the Kalman filter(s) 440 of the individual IMUs 210, 216, 222, 228 and dimensional design information such as the machine state parameters 202 specific to the machine 101 from a dimensional design information database 450, and solve for a frame rotation and position at each component 104, 150, 152, 154 or point of interest on the machine 101. The frame may have offsets applied to the information derived from the IMUs 210, 216, 222, 228 in order to solve for any particular point on the machine 101, and all the updated position information may be provided to the machine controller 201, which may be associated with or programmed as part of a machine ECM.

In the case of an excavator depicted in FIG. 1 and used as an exemplary platform throughout this description or other machine where IMUs 210, 216, 222, 228 may be mounted on the components 104, 150, 152, 154 of the machine 101 that are rotated or swung through an arc during operation, the three-dimensional (3D) position information associated with each of the IMU modules 110, 12, 114, 116 mounted on those components 104, 150, 152, 154 of the machine 101 may also be fed back to a swing compensation module 420.

The swing compensation module 420 may be configured to correct the acceleration information provided by the IMUs 210, 216, 222, 228 of the IMU modules 110, 12, 114, 116 mounted on the rotating or swinging components 104, 150, 152, 154 of the machine 101 by compensating for centripetal acceleration. This correction of the acceleration information received from the IMUs 210, 216, 222, 228 may be performed before the information is provided to the Kalman filter 440.

The additional non-IMU sensors 280-1, 280-2, 280-3, 280-4 may include any devices capable of generating signals indicative of parametric values or machine parameters associated with performance of the machine 101. For example, the non-IMU sensors 280-1 may include sensors configured to produce signals indicative of boom 150 and/or stick 152 swing velocity, boom 150 and/or stick 152 position in global and machine reference frames 170, and bucket 154 angle. A payload sensor may also be included and configured to provide a signal indicative of a payload of the machine 101. A slip detector may be included and configured to provide a signal indicative of a slip of the machine 101. Additional non-IMU sensors may include devices capable of providing signals indicative of a slope of the ground on which the machine 101 is operating, an outside temperature, tire pressure if the traction device 102 is a wheel, hydraulic or pneumatic pressures in various fluid actuation control devices such as the hydraulic swivel 103 and hydraulic pistons 190, 192, 194, electrical voltages, currents, and/or power being supplied to electrical control devices, among other operating parameters.

The non-IMU sensors 280-1 may include locating devices capable of providing signals indicative of the location of the machine 101 and/or the position of various components 104, 150, 152, 154 of the machine 101 relative to a global reference frame 170. For example, a locating device could embody the GPS device 180 that receives or determines positional information associated with machine 101 and may provide an independent measurement of the position of the machine 101. The locating device and any other non-IMU sensor 280-1 may be configured to convey signals indicative of the received or determined positional information, or other information relating to various machine operational parameters to interface devices such as an integrated display device in an operator cab of the body 104 for display of real time machine operating characteristics. The signals from the IMUs 210, 216, 222, 228 and non-IMU sensors 280-1 may be directed to a controller such as the SE 304 (i.e., the SEs 214, 220, 226, 232 of FIG. 2) configured to include a Kalman filter 440. Information 430 from the additional non-IMU sensor 280-1 including data representing measurements obtained by the additional non-IMU sensor 280-1 may be collected and transmitted to the SE 304 for fusing with data obtained from the IMU 210 and/or the GPS device 180.

The Kalman filter 440 may be configured for implementation by processors 441 associated with a data storage device 443 and memory 445. The processors 441 of the controller may be configured to implement a Kalman filtering process including sensor fusion performed in a sensor fusion module 442. The Kalman filter 440 may also be configured to perform gyroscope bias estimation in a gyroscope bias estimation module 444 in order to compensate for any drift over time in the readings provided by gyroscopes associated with the IMUs 210. In one example, a locating device such as the GPS device 180 may receive a GPS signal as the location signal indicative of the location of the machine 101 and provide the received location signal to the processor 441 for processing within the Kalman filter. For example, the processor 441 may use the GPS signal from the GPS device 180 to fuse the GPS signals with other types of data received from the IMUs 210, 216, 222, 228, the non-IMU sensors 280-1, 280-2, 280-3, 280-4 and other sensors. Additionally, the locating device may also provide an uncertainty measure associated with the location signal. The examples described herein may be modified to utilize other indicators of the location of the machine 101, if desired.

The non-IMU sensors 280-1 may also include perception sensors. The perception sensors may include any device that provides scene data describing an environment in the vicinity of the machine 101. A perception sensor may embody a device that detects and/or ranges objects located 360 degrees around the machine 101. For example, a perception sensor may be embodied by a LIDAR device, a radio detection and ranging (RADAR) device, a sound navigation and ranging (SONAR) device, a camera device, or another perception sensor. In one example, a perception sensor may include an emitter that emits a detection beam, and an associated receiver that receives a reflection of that detection beam. Based on characteristics of the reflected beam, the sensor can determine a distance and a direction from an actual sensing location of the perception sensor on the machine 101 to a portion of a sensed physical object. By utilizing beams in a plurality of directions, the perception sensor may generate an image of the surroundings of the machine 101. For example, if the perception sensor is embodied by a LIDAR device or another device using multiple laser beams, the perception sensor, such as a laser sensor mounted on the stick 152 of the machine 101, may generate a cloud of points as the scene data describing an environment in the vicinity of the machine 101. The scene data may be limited to the front side (180 degrees or less) of the machine 101 in some examples. In one example, the perception sensor may generate scene data for objects located 360 degrees around the machine 101.

The IMUs 210, 216, 222, 228 may include devices that provide angular rates and acceleration of the machine 101 or, more particularly, of components or portions of the machine on which the IMUs are mounted, such as the machine body 104, the boom 150, the stick 152, and the bucket or other tool 154. For example, the IMUs 210, 216, 222, 228 may include a 6-degree of freedom (6 DOF) IMU. A 6 DOF IMU sensor includes a 3-axis accelerometer, 3-axis angular rate gyroscopes, and, in some examples, a 2-axis inclinometer. Each of the IMUs 210, 216, 222, 228 may be retrofitted to an existing machine by welding the IMU to a component 104, 150, 152, 154 of the machine 101 where precise information on the real time position, orientation, and motion of that particular component 104, 150, 152, 154 of the machine 101 is desired. An electronic control module (ECM) or other machine controller(s) of the machine 101 may be programmed to receive signals from the IMUs 210, 216, 222, 228 and implement various machine controls based at least in part on the inputs received from the IMUs 210.

In one example, the controls implemented by an ECM in response to the signals received from the IMUs 210, 216, 222, 228 may include actuation of electrical or electro-hydraulic solenoids that are configured to control the opening and closing of valves regulating the supply of pressurized hydraulic or pneumatic fluid to fluid actuation cylinders associated with the hydraulic plant 107. The 3-axis angular rate gyroscopes associated with the IMUs 210, 216, 222, 228 may be configured to provide signals indicative of the pitch rate, yaw rate, and roll rate of the machine 101 or of the specific portion of the machine 101 on which the IMU 210 is mounted. The 3-axis accelerometer may be configured to provide signals indicative of the linear acceleration of the machine 101 or portion of the machine 101 on which the IMU 210 is mounted, in the x, y, and z directions.

The Kalman filter module 240 may be associated with the processor 441, data storage device 443, and memory 445, included together in a single device and/or provided separately. The processor 441 may include processing devices, such as a microprocessor or any other type of data processing device. The memory 445 may include storage devices configured to store information used by the Kalman filter 440 to perform certain functions related to the examples described herein. The data storage device 443 may include a volatile or non-volatile, magnetic, semiconductor, tape, optical, removable, nonremovable, or other type of storage device or computer-readable medium or device. The data storage device 443 may store programs and/or other information, such as information related to processing data received from a number of sensors, as discussed in greater detail below.

In one example, the memory 445 may include position estimation programs or subprograms loaded from the data storage device 443 or elsewhere that, when executed by the processor 441, perform various procedures, operations, or processes consistent with the disclosed examples. For example, the memory 445 may include programs that enable the Kalman filter 440 to, among other things, collect data from an odometer, a locating device, a perception sensor, any of the IMUs 210, and any of the non-IMU sensors 280-1, and process the data according to the examples described herein, and estimate the position(s) of the machine 101 and components 104, 150, 152, 154 of the machine 101 in real time based on the processed data.

Kinematics may be used by the machine controller 201, the IMUs 210, 216, 222, 228 of the IMU modules 110, 112, 114, 116, and other processing devices described herein to determine the motion of the traction devices 102, the machine body 104, the boom 150, the stick 152, the bucket 154, and/or other moving elements of the machine 101 as points on these elements, as individual objects within the machine 101, and as a system of objects (collectively together). A kinematics evaluation may include calculating and defining the geometry of the system and declaring the initial conditions of any known values of position, velocity and/or acceleration of the traction devices 102, the machine body 104, the boom 150, the stick 152, the bucket 154, and other moving elements of the machine 101. Ten, using an equation, the position, velocity and acceleration of the individual and collective objects may be determined. Thus, kinematic equations may be used to describe the motion of systems composed of joined or jointed parts (e.g., multi-link systems) such as the traction devices 102, the machine body 104, the boom 150, the stick 152, the bucket 154, and other moving elements of the machine 101.

In one example, position estimation programs may enable the Kalman filter 440 of the processor 441 to process the received signals to estimate the real time positions and orientations of the components 104, 150, 152, 154 of the machine 101. A Kalman filter 440 implements a method that may be used to determine accurate values of measurements observed over time, such as measurements taken in a time series. The operation of the Kalman filter 440 involves two phases, a propagation or "predict" phase and a measurement or "update" phase. In the predict phase, the value estimate from the previous time period in the time series is used to generate an a priori value estimate. In the update phase, the a priori estimate calculated in the predict phase is combined with an estimate of the accuracy of the a priori estimate (e.g., the variance or the uncertainty), and a current measurement value to produce a refined a posteriori estimate. The Kalman filter 440 is a multiple-input, multiple output digital filter that may optimally estimate, in real time, the states of a system 100 based on its noisy outputs. These states are variables used to describe the system 100 behavior as a function of time (such as position, velocity, voltage levels, etc.). The multiple noisy outputs may be thought of as a multidimensional signal plus noise, with the system states being the desired unknown signals indicative of the true values for each of the variables. The Kalman filter 440 may be configured to filter the noisy measurements, such as the measurements received as signals from the plurality of IMUs 210, 216, 222, 228 mounted on different portions and components of the machine 101, to estimate desired signals. The estimates derived by the Kalman filter 440 from the signals provided by the IMUs 210, 216, 222, 228 and non-IMU sensors 280-1 are statistically optimal in the sense that they minimize the mean-square estimation error of the signals. The state uncertainty estimate for the noisy measurements may be determined as a covariance matrix, where each diagonal term of the covariance matrix is the variance or uncertainty of a scalar random variable. A gain schedule module 422 may be configured to calculate weights (or gains) to be used when combining each successive predicted state estimate with a successive actual measurement value to obtain an updated "best" estimate. As the Kalman filter 440 receives multiple measurements over time from the IMUs 210, 216, 222, 228 and the non-IMU sensors 280-1, a recursive algorithm of the Kalman filter 440 processes each of the multiple measurements sequentially in time, iteratively repeating itself for each new measurement, and using only values stored from the previous cycle. This specific methodology saves computing resources including memory and reduces computational time.

In one example, the memory 445 may include pose estimation programs or subprograms loaded from the data storage device 443 or elsewhere that, when executed by the processor 441, perform various procedures, operations, or processes consistent with the examples described herein. For example, the memory 445 may include programs that enable the Kalman filter 440 to, among other things, collect data from the above-mentioned IMU modules 110, 112, 114, 116, additional sensors 280-1, 180-2, 180-3, 180-4, and other data sources, and process the data according to disclosed systems and methods described herein, and determine a state of the machine 101 based on the processed data.

In one example, the memory 445 may store program enabling instructions that configure the Kalman filter 440 (more particularly, the processor 441) to implement a method that uses the Kalman filter 440 to estimate a state of the machine 101. In one example, the Kalman filter 440 may be configured to utilize the following equations in its calculations. For the propagation or "predict" phase, the Kalman filter 440 may be configured to utilize the following equations:

$$\hat{x}_k^- = F_{k-1}\hat{x}_{k-1} + G_{k-1}u_{k-1} \qquad \text{Eq. 1}$$

$$P_k^- = F_{k-1}P_{k-1}F_{k-1}^T + Q_{k-1} \qquad \text{Eq. 2}$$

For the measurement or "update" phase, the Kalman filter may be configured to utilize the following equations:

$$K_k = P_{k-1}^- H_k^T (H_k P_{k-1}^- H_k^T + R_k)^{-1} \qquad \text{Eq. 3}$$

$$\hat{x}_k^+ = \hat{x}_k^- + K_k(y_k - H_k \hat{x}_k^-) \qquad \text{Eq. 4}$$

$$P_k^+ = (I - K_k H_k) P_k^- \qquad \text{Eq. 5}$$

In the above equations, $\hat{x}_k^-$ is the a priori state estimate of a certain state variable (e.g., pitch rate, yaw rate, roll rate, position, velocity, etc.) that is calculated based on a value ($\hat{x}_{k-1}$) of the state variable from an immediately preceding time period. F, G, and H may be appropriate state transition matrices. In the measurement or "update" phase, the Kalman filter 440 may calculate the Kalman gain $K_k$ utilizing Eq. 3, in which P is an error covariance matrix and R is a matrix setting forth the variance associated with the different state variables. For example, the values in the R matrix may specify the uncertainty associated with the measurement of a given state variable. In the measurement phase, the Kalman filter 440 may also obtain an independent measure of the state variable and set the independent measure as $y_k$. Utilizing the a priori estimate $\hat{x}_k^-$ from the "predict" phase, measurement $y_k$, and the Kalman gain $K_k$ (applied from the gain schedule module 422), the Kalman filter 440 may calculate the a posteriori state estimate $\hat{x}_k^+$ utilizing Eq. 5.

Figure 5:
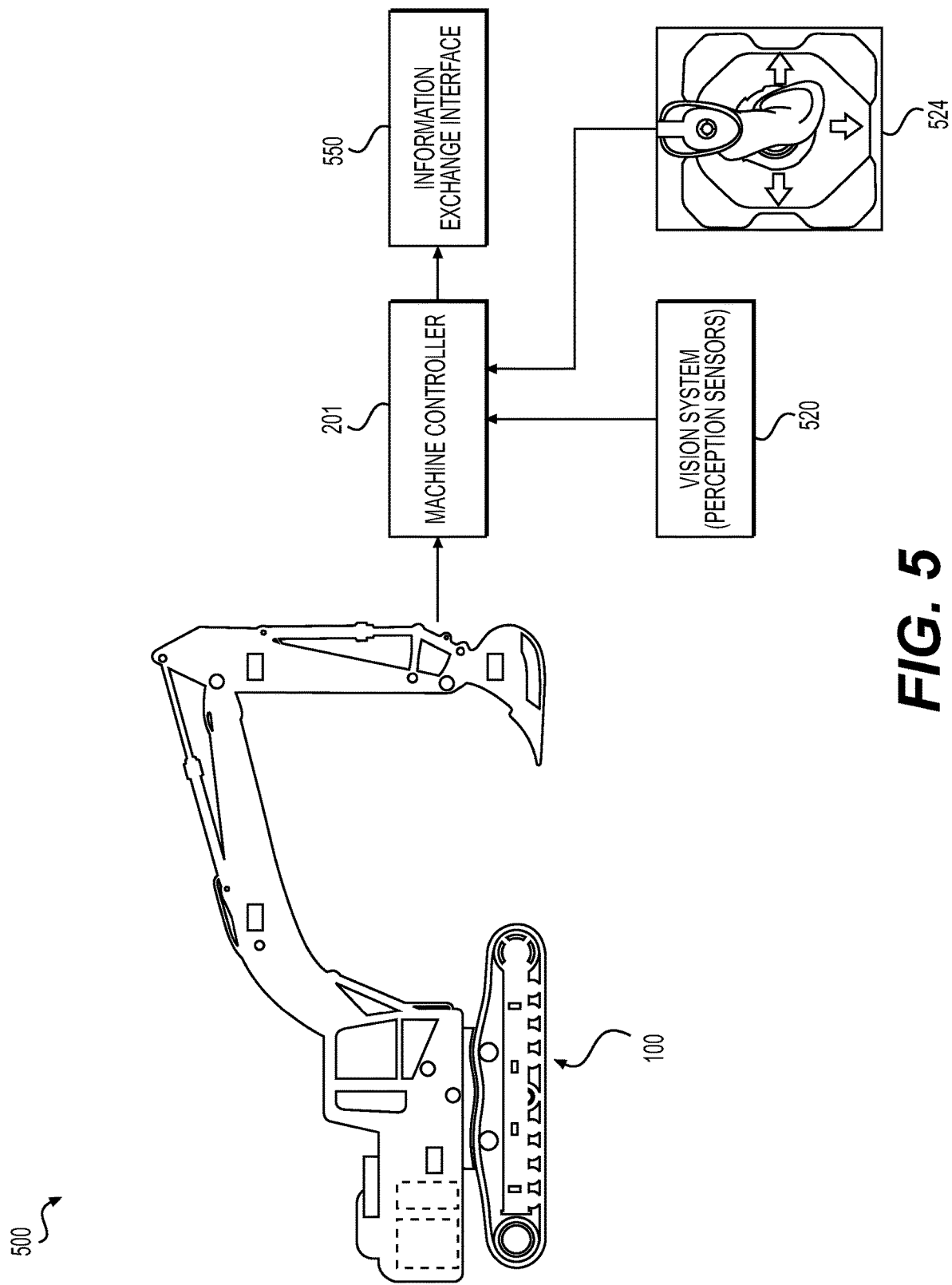
FIG. 5 is a schematic illustration of an application of the outputs from the sensor fusion system of FIG. 4 for providing real time information used in controlling operations, pose and state of the machine of FIG. 1.

FIG. 5 is a schematic illustration of an application of the outputs from the sensor fusion system 400 of FIG. 4 for providing real time information used in controlling operations, pose and state of the machine 101 of FIG. 1. In one application of the machine state control system 500 according to an example, accurate, updated, real time information on the positions and orientations (i.e., the pose) of the machine 101 and components 104, 150, 152, 154 of the machine 101 may provide feedback to an information exchange interface 550 in order to effect machine controls that achieve optimal positioning and operation of the machine 101 and components 104, 150, 152, 154 of the machine 101 for improved productivity and reliability. In one example, the feedback may assist an operator by coaching the operator on how to effect controls that result in improved machine footing and stability, and hence improved productivity. In another example, the information received at the information exchange interface 550 may result in the generation of autonomous or semi-autonomous control command signals that are provided to various machine systems and subsystems for effecting changes in machine pose and changes in the relative positions and orientations of the components 104, 150, 152, 154. In one example, as shown in FIG. 3, sensor feedback from machine sensors regarding machine linkage positions and velocity, machine pitch rate and roll rate, and swing angle for the boom 150 and stick 152 of an excavator may be fused with signals provided by a vision system and perception sensors 520 indicative of the locations of obstacles or other features at a job site, and signals received from various operator controls 524. The fused data may be provided to the information exchange interface 550 in order to affect the generation of control command signals that change the operation of various solenoid actuators, throttle controls, fluid cylinder actuation devices, electrical controls, and motion control devices to result in the optimal positioning of the machine 101 during, for example, a digging operation. The information exchange interface 550 may provide accurate and real time updated information to a human operator in some examples, as well as acting as an information interface with autonomous or semi-autonomous control systems that use the information to process control command signals for operating various machine systems and machine subsystems automatically or semi-automatically.

In digging with the machine 101 such as the example excavator, the machine controller 201 of the machine state control system 500 may determine from historical and/or empirical data regarding the kinematics and dynamics for the machine 101 that the body 104 of the machine 101 may be parallel to the digging linkages with the idler wheels for the traction devices 102 of the machine 101 pointed toward the front linkages for the best stability during digging. Feedback may also be provided to the information exchange interface 550 regarding the machine pitch and roll so that if the footing is poor underneath the idler wheels when the tracks of the excavator are pointed forward, the information exchange interface can result in the generation of control command signals that cause a change in the pose of the machine 101 to improve the footing and prevent the machine 101 from pitching and rolling, as well as maneuvering the machine 101 to make full contact with the ground to counteract digging forces. The angle of the bucket 154 or other tool and the leverage being achieved by the particular orientation of the stick 152 and boom 150 at any particular point in time during a digging operation may also impact the digging efficiency of the excavator (i.e., machine 101).

The machine state control system 500 may provide continually updated feedback information to the information exchange interface 550 regarding the real time efficiency of a linkage position during digging. The feedback information may result in a change to the angle of the bucket 154 or the position of the stick 152 during excavation in order to improve the efficiency of the machine 101 by achieving better loading of the bucket 154, quicker loading of the bucket 154, and/or improved kinematics of the linkages that will result in a better use of the machine power and improve the longevity of the machine 101. The information provided to the information exchange interface from the machine state control system 500 may also result in a change in control command signals that cause a change in the pose of the machine 101 to avoid digging with the body 104 oriented at 90 degrees to the linkage, which is not optimal for stability or digging. When machine controls respond to the information provided at the information exchange interface 550 to implement controls such that the body 104 of the machine 101 is parallel to the digging linkages 150, 152, 154 with the idler wheels for the traction devices 102 of the excavator pointed toward the front linkages, the result is that energy is not wasted lifting the machine 101 off the ground, productivity rates are increased with the resulting reduced cycle times, and loads on the final drive components are reduced for improved longevity of the machine 101 and reduced down time.

Figure 6:
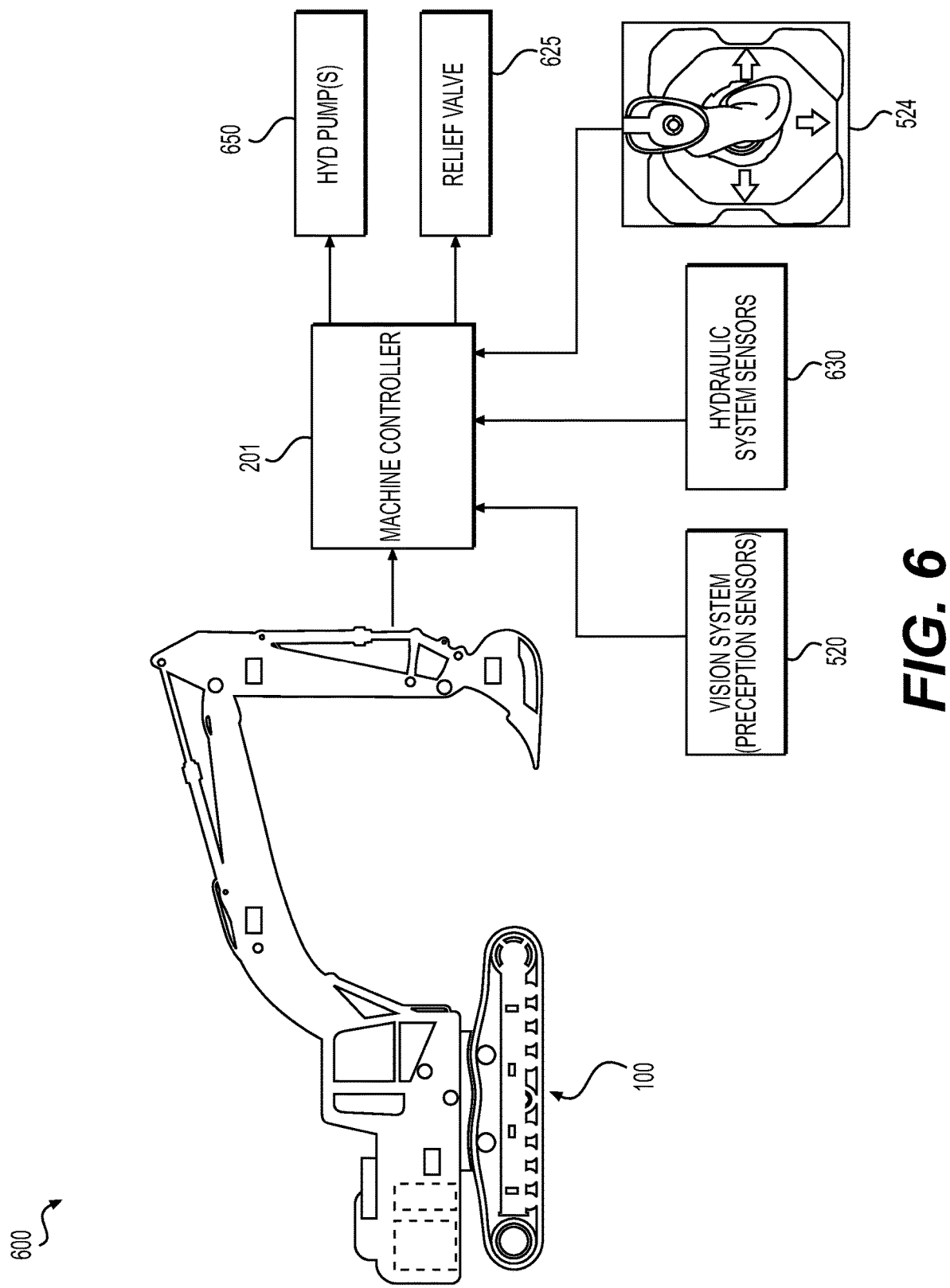
FIG. 6 is a schematic illustration of an application of the outputs from the sensor fusion system of FIG. 4 for providing boosted hydraulic pressure outputs during selected operations of the disclosed machine of FIG. 1.

FIG. 6 is a schematic illustration of an application of the outputs from the sensor fusion system 400 of FIG. 4 for providing boosted hydraulic pressure outputs during selected operations of the disclosed machine 100 of FIG. 1. In another application of the machine state control system 600 according to this disclosure, as shown in FIG. 6, the sensor fusion system may receive, combine, and process operator command inputs received from operator controls 524 with inputs from the IMUs 210, 216, 222, 228, the GPS device 180, and/or non-IMU sensors 280-1, 280-2, 280-3, 280-4 that measure linkage position, fluid pressures, engine speed, machine pose, machine component positions and orientations (including pitch rate, yaw rate, and roll rate), inputs from a vision system 520 that includes perception sensors providing signals indicative of the presence and location of objects, and inputs from hydraulic system sensors 630. In some examples, the signal inputs from the hydraulic system sensors 630 may be indicative of conditions under which higher pressures for fluid actuation cylinders used to avoid stalling. In order to avoid unnecessary stresses on the machine 101, the components 104, 150, 152, 154, and structures, the machine state control system 600 may be configured to automatically adjust boost pressures of hydraulic pumps 650 associated with the hydraulic plant 107 and command a controlled ramp up in relief pressure set points for relief valves 625 if possible without causing damage to the machine 101 or creating instabilities. The fused sensor outputs from the sensor fusion system 400 according to the examples described herein allow the machine state control system 600 to determine when the machine 101 may be stalling or about to stall during a lifting or digging operations. The machine state control system 600 may then determine when and how much to boost relief pressure settings for the relief valve(s) 625 based on the fused sensor feedback information in combination with operator commands.

In one example, a machine 101 such as an excavator may be lifting a heavy load or performing a digging operation, and the hydraulic pistons 190 associated with the boom 150 may be at their maximum pressure, with the pump output pressure equal to the pressure in the hydraulic pistons 190 and the boom 150 stalled while the bucket 154 and stick 152 are moving. The machine state control system 600 may determine from the accurate, real time fused sensor data being received from the sensor fusion system 400, including data indicative of the pitch rate, and roll rate for the machine 101, whether the machine 101 is in an unstable and/or overstressed state. The machine state control system 600 may determine that the relief pressure for the hydraulic pistons 190 may be increased in a controlled ramp up to get the boom 150 moving again without exceeding acceptable stress levels, and while maintaining the stability of the machine 101.

In one example of the machine state control system 500, 600 according to the examples described herein, the machine state control system 500, 600 may output commands to adjust the maximum output pressure of a pump providing pressurized fluid to the hydraulic pistons 190, 192, 194 on the machine 101. As depicted in FIG. 6, the machine state control system 600 receives the fused sensor data from the sensor fusion system 400, including operator inputs, measured linkage positions, fluid pressures, engine speeds, machine pitch rates and roll rates, and scene data such as the presence and location of objects. The machine state control system may determine what operations are being conducted, and adjust the maximum pressures allowed in the system electronically through high pressure cut offs that are established for different operations. The system can thereby prevent excessive stresses on various components and structures of the machine 101, and also prevent over-torqueing of the components or slamming of the components into objects at high rates of speed by slowing down pump flow, varying swing motor displacement, or overriding valve commands received from operator inputs. For components 104, 150, 152, 154 of a machine such as the boom 150 and stick 152 of an excavator, which may include an associated dedicated hydraulic swing circuit for moving the boom 150 and stick 152 between digging and dumping positions, the hydraulic pressure in the swing circuit or swing motor displacement may be electronically limited in accordance with real time output commands received from the machine state control system 600.

In one example, pumps associated with the hydraulic plant 107 and provided in the swing circuit or other hydraulic circuits on the machine 101 may be adaptable to a zero displacement or near-zero displacement operational configuration. The machine state control system 600 may determine what operations are being conducted and adjust the displacement of the pumps to a zero or near-zero displacement in certain situations. The displacement of the pumps may be adjusted to a low enough value that only leakage of the system is compensated for, and movement of a linkage by a fluid actuation cylinder supplied by the pump or pumps in a very low displacement mode will not result in overstressing of the linkage or other machine components 104, 150, 152, 154. In addition to or as an alternative to overriding valve commands or other control commands received from operator inputs in a semi-autonomous mode, the machine state control system 600 may provide feedback directly to an operator through displays associated with the information exchange interface 550, or through haptic feedback in joysticks, the operator seat, heads-up displays (HUD) projected onto a windshield of the operator cab, or through sounds and other stimuli implemented to coach the operator and improve future operational control commands.

Figure 7:
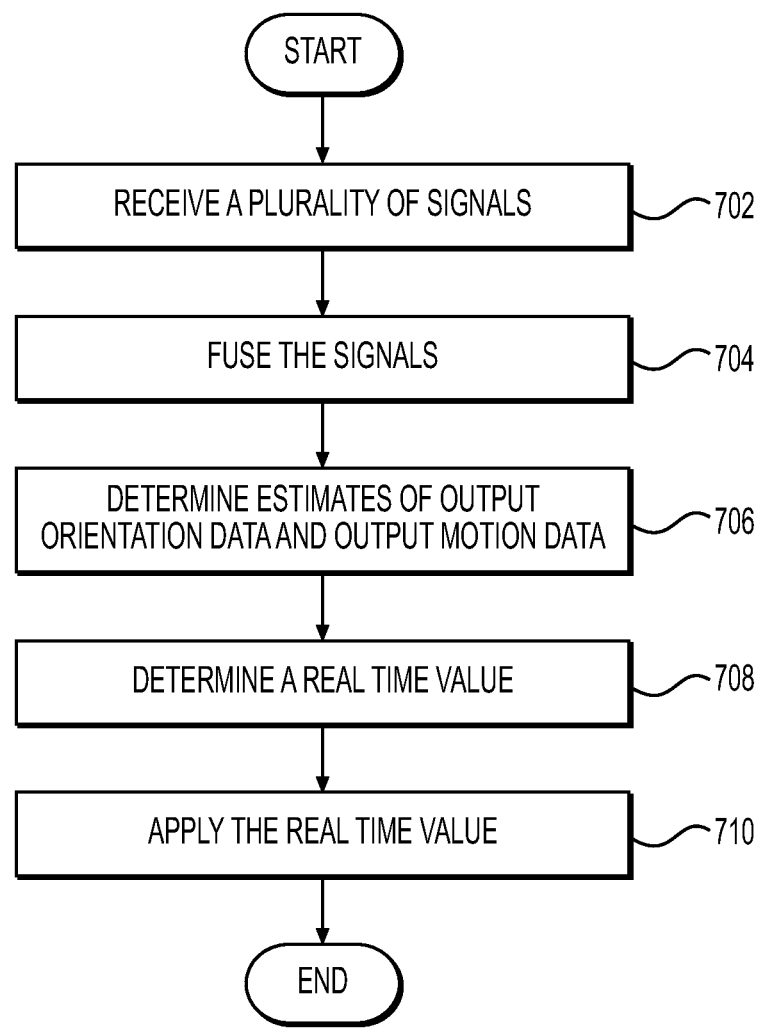
FIG. 7 is a flowchart depicting a method of controlling movement of a machine, according to an example of the principles described herein.

Having described the system 100 of FIG. 1, the mesh network 200 of FIG. 2, an example IMU module 300 of FIG. 3, the sensor fusion system 400 of FIG. 4, and the machine state control systems 500, 600 of FIGS. 5 and 6, the methods of controlling movement of the machine 101 will now be described in connection with FIGS. 7 and 8. FIG. 7 is a flowchart depicting a method 700 of controlling movement of a machine 101, according to an example of the principles described herein. The method of FIG. 7 may include receiving (block 702), from a plurality of IMU modules 110, 112, 114, 116 mounted on a corresponding plurality of components 104, 150, 152, 154 of the machine 101, a plurality of signals indicative of orientation measurements and/or motion measurements for the components 104, 150, 152, 154 of the machine 101 on which the plurality of IMU modules 110, 112, 114, 116 are mounted. The IMU modules 110, 112, 114, 116 include a corresponding number of SEs 214, 220, 226, 232. Further, the IMU modules 110, 112, 114, 116 form a mesh network 200 communicatively coupled to a common communication bus 250.

The method 700 may also include, for example, with the first SE 214 of the first IMU module 110 fusing, at block 704, the signals received from separate IMU modules 110, 112, 114, 116. The signals are indicative of the measured pose and state of the machine 101. In the examples described herein, the first IMU module 110 may be any one of the IMU modules 110, 112, 114, 116 within the mesh network 200 assigned by the machine controller 201 as the first in a mesh node order defined by the machine controller 201 to receive the signals from the separate IMU modules 110, 112, 114, 116. The separate IMU modules 110, 112, 114, 116 may include any number of the IMU modules 110, 112, 114, 116 that transmit the signals to the first IMU module 110. The fusing of the signals received from the separate IMU modules 110, 112, 114, 116 at block 704 includes, combining the orientation measurements and the motion measurements from the separate IMU modules 110, 112, 114, 116 to estimate the output orientation data and output motion data for the components 104, 150, 152, 154 of the machine 101 on which the first IMU module 110 is mounted.

In the examples described herein, the fusing (block 704) of the signals received from the separate IMU modules 110, 112, 114, 116 includes fusing at least one of the pose and state measurements from the first IMU module 110, second pose and state measurements from the separate IMU modules 110, 112, 114, 116 other than the first IMU module 110, and at least one additional measurement obtained from at least one additional sensor device such as the GPS device 180, the non-IMU sensors 280-1, 280-2, 280-3, 280-4, and other sensors described herein. This fusion (block 704) of the different signals allows for the system 100 to estimate the outputs $\Omega_1$, $\Omega_2$, $\Omega_3$, $\Omega_4$ for the components 104, 150, 152, 154 of the machine 101 on which the IMU modules 110, 112, 114, 116 are mounted.

At block 706, the first SE 214 of the first IMU module 110 determines estimates of output orientation data and output motion data for the components 104, 150, 152, 154 of the machine 101 on which the plurality of IMU modules 110, 112, 114, 116 are mounted. The IMU modules with respect to each of the components 104, 150, 152, 154 of the machine 101 on which the plurality of IMU modules 110, 112, 114, 116 are mounted and in reference to a machine reference frame 170 based on the fused signals determined at block 704.

The first SE 214 of the first IMU module 110 may determine, at block 708, a real time value for at least one of position, velocity, and/or acceleration of the components 104, 150, 152, 154 of the machine 101 based on a kinematic evaluation using the output orientation data and output motion data for the components 104, 150, 152, 154 of the machine 101. The kinematic evaluation may include the computation of at least one kinematic equation obtained from the kinematic library module 460 and/or through the empirical derivation of the kinematics and dynamics using physics-based equations and algorithms.

At block 710, the determined real time value is applied in an implementation of a controlled operational movement of the components 104, 150, 152, 154 of the machine 101. The real time value is reflective of a signal that is indicative of the true and accurate values for each of the variables without noise, measurement drift (e.g., as in the case of gyroscope drifting), systematic errors in measurements, and other measurement anomalies, and causes the real time values to converge on the best estimates of the true values for output joint angles, velocity, and/or acceleration for each component 104, 150, 152, 154 of the machine 101. More regarding the processes of fusing signals and obtaining the real time values is described herein in more detail.

Figure 8:
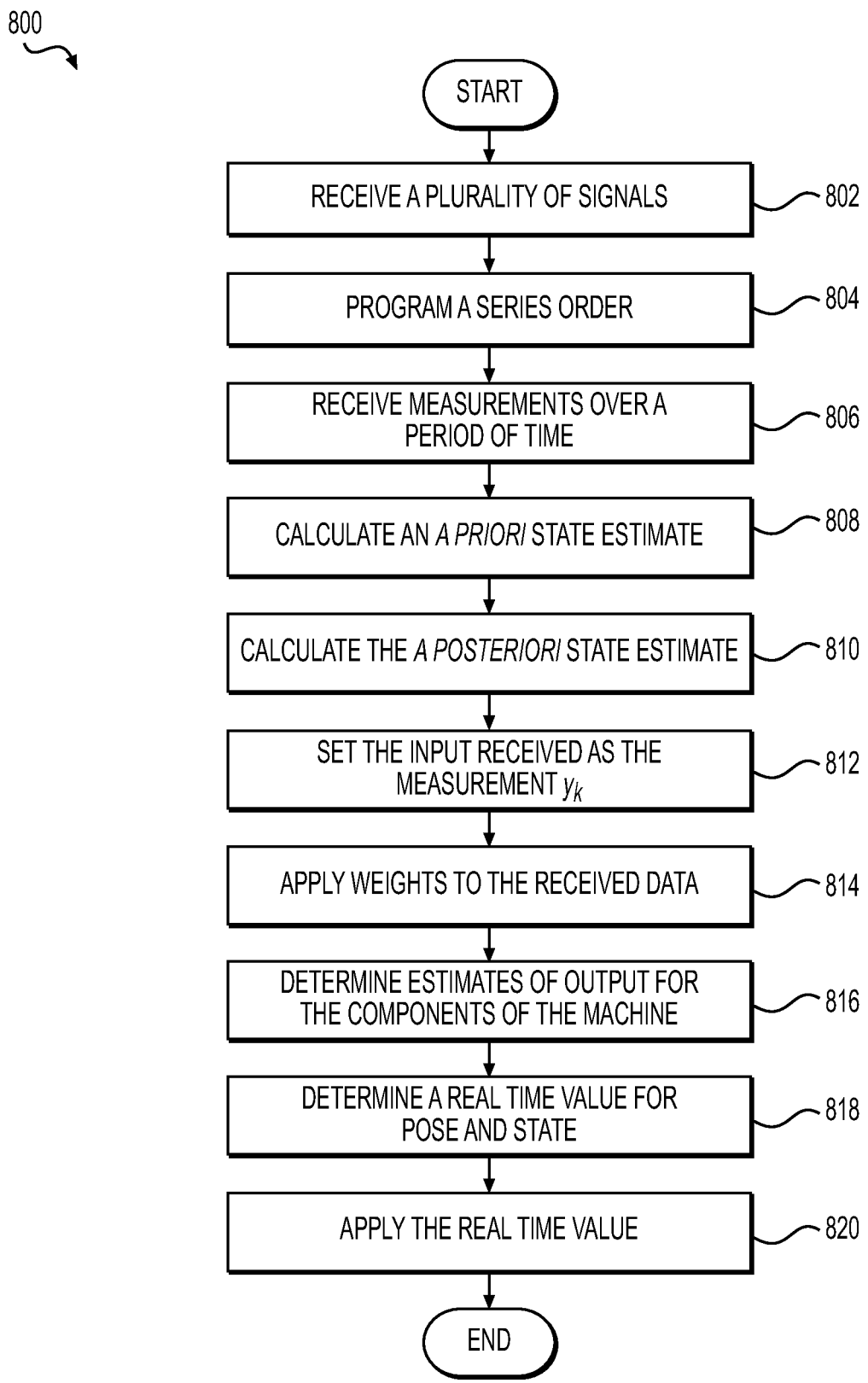
FIG. 8 is a flowchart depicting a method of controlling movement of a machine, according to another example of the principles described herein.

FIG. 8 is a flowchart depicting a method 800 of controlling movement of a machine 101, according to another example of the principles described herein. The method 800 of FIG. 8 may include receiving (block 802), from a plurality of IMU modules 110, 112, 114, 116 mounted on a corresponding plurality of components 104, 150, 152, 154 of the machine 101, a plurality of signals indicative of orientation measurements and motion measurements for the components 104, 150, 152, 154 of the machine 101 on which the plurality of IMU modules 110, 112, 114, 116 are mounted.

At 804, the method 800 may include programming, via the machine controller 201, a series order by which the IMU modules 110, 112, 114, 116 fuse the signals. The mesh node order may define the order by which the machine controller 201 instructs the IMU modules 110, 112, 114, 116 to provide their respective outputs $Q_1$, $Q_2$, $Q_3$, $Q_4$ to the other IMU modules 110, 112, 114, 116 and/or the machine controller 201. The mesh node order provides for the IMU modules 110, 112, 114, 116 to perform their data processing defined herein in series, and the machine controller 201 programs or defines the mesh node order. In the examples described herein, the machine controller 201 programs the series, mesh node order.

The method 800 may continue at block 806 by receiving the orientation measurements and motion measurements (i.e., measurements representing the pose and state of the machine 101 and its components 104, 150, 152, 154) over a period of time. The method 800 may also include, with a first SE 214 of a first IMU module 110, fusing the signals received from separate IMU modules 110, 112, 114, 116. The IMU modules 110, 112, 114, 116 include a corresponding number of SEs 214, 220, 226, 232.

As described herein, the fusing of the signals is performed by applying a Kalman filter 440. In the predict phase at block 808, the Kalman filter 440 may utilize inputs from the IMUs 210, 216, 222, 228 (such as the linear acceleration values from an accelerometer of an IMU 210, 216, 222, 228 and the angular rates of motion values from a gyroscope of an IMU 210, 216, 222, 228) and a speed sensor associated with the traction devices 102 to calculate an a priori state estimate of a certain state variable (e.g., pitch rate, yaw rate, roll rate, position, velocity, among other measurements). In the predict phase, the Kalman filter 440 may execute Eq. 1 and Eq. 2. For example, in the predict phase, the Kalman filter 440 may calculate $\hat{x}_k^-$ (i.e., the a priori state estimate) of state variables using a value $\hat{x}_{k-1}$ of the state variable from an immediately preceding time period and the inputs from the IMUs 210, 216, 222, 228 and/or a speed sensor associated with the traction devices 102. In one example, $\hat{x}_{k-1}$ may be obtained from the update phase as the output value of the immediately preceding time period.

Following the predict phase, the Kalman filter 440 may implement the update phase at block 810 to calculate the a posteriori state estimate $\hat{x}_k^+$ utilizing, for example, EQ. 4. For example, the Kalman filter 500 may calculate the a posteriori state estimate $\hat{x}_k^+$ using the a priori estimate $\hat{x}_k^-$ from the predict phase, measurement $y_k$, and the Kalman gain $K_k$. The Kalman filter 440 may also receive as input, in the update phase, acceleration values from inclinometers of the IMUs 210, 216, 222, 228 and location signals from locating devices such as the GPS devices 180.

The Kalman filter 440 may, at block 812 set the input received from a locating device and from inclinometers included as part of or associated with the IMUs 210, 216, 222, 228 as the measurement $y_k$ in Eq. 4. Further, in one example where the machine 101 is an excavator or other machine that includes components 104, 150, 152, 154 that are rotated or swung through arcs during operation, the Kalman filter 440 may receive acceleration values from the IMUs 210, 216, 222, 228 located on the rotating or swinging components 104, 150, 152, 154 of the machine 101 such as, for example, the body, 104, the boom 150, the stick 152, and the bucket 154 that have been pre-processed in the swing cancellation module 420 to compensate for centripetal acceleration occurring during the swinging motion. The centripetal acceleration compensation for values from the IMUs 210, 216, 222, 228 may be performed on the raw acceleration data from the IMUs 210, 216, 222, 228 before the acceleration data is utilized in Eq. 4.

Also, as described herein, the Kalman filter 440 may be configured to execute Eq. 3 and Eq. 5 in the update phase. Using the above, the Kalman filter 440 may be configured to generate the a posteriori state estimate $\hat{x}_k^+$ as output of the Kalman filter 440. Without limitation, the a posteriori state estimate $\hat{x}_k^+$ may include the state of the machine 101, and may include parameters such as velocity, position, acceleration, and orientation, among other parameters. The Kalman filter 440 is useful for combining data from several different indirect and noisy measurements to try to estimate variables that are not directly measurable. For example, the gyroscopes of the IMUs 210, 216, 222, 228 measure orientation by integrating angular rates, and therefore the output signals from the gyroscopes may drift over time. The inclinometer and direction heading features such as a compass of the IMUs 210, 216, 222, 228 may provide a different noisy, but drift-free measurement of orientation. In the examples described herein, the Kalman filter 440 may be configured to weight, at block 814, the two sources of information appropriately using weights retrieved from the gain schedule module 422 to make the best use of all the data from each of the sources of information.

In determining the state of the machine 101 using the Kalman filter 440, the Kalman filter 440 may also be configured to consider other operational parameters of the machine 101. For example, if the machine 101 is an excavator as provided in the examples herein, the Kalman filter 440 may be configured to consider whether the machine 101 is digging, dumping, swinging in between digging and dumping positions, and driving to a new location, among other operational states. When the machine 101 is in the above operational states, certain parameters of the Kalman filter 440 may be changed to reflect the accuracy or confidence in certain input parameters. For example, when the machine 101 is driving from one location to another, the Kalman filter 440 may be configured to apply a lower weighting (i.e., gain) from the gain schedule module 422 to the input from the inclinometers of the IMUs 210, 216, 222, 228. To lower the weighting applied to the inclinometer input from the IMUs 210, 216, 222, 228, the Kalman filter 440 may be configured to increase the value of variance R associated with the inclinometer input in Eq. 3. Similarly, when the machine 101 is digging, the Kalman filter 440 may be configured to increase the weighting applied to the inclinometer input to reflect a higher confidence in the accuracy of the inclinometer input. For example, to indicate a higher confidence in the accuracy, the Kalman filter 440 may be configured to apply a higher weighting (i.e., gain) from the gain schedule module 422 to the input from the inclinometers of the IMUs 210, 216, 222, 228 and decrease the value associated with the inclinometer input.

At block 816, the first SE 214 of the first IMU module 110 determines estimates of output orientation data and output motion data for the components 104, 150, 152, 154 of the machine 101 on which the plurality of IMU modules 110, 112, 114, 116 are mounted. The first SE 214 of the first IMU module 110 may determine, at block 818, a real time value for at least one of position, velocity, and/or acceleration of the components 104, 150, 152, 154 of the machine 101 based on a kinematic evaluation using the output orientation data and output motion data for the components 104, 150, 152, 154 of the machine 101. At block 820, the determined real time value is applied in an implementation of a controlled operational movement of the components 104, 150, 152, 154 of the machine 101.

Aspects of the present systems and methods are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processors 212, 218, 224, 230, the machine controller 201 of the system 100 or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

INDUSTRIAL APPLICABILITY

The present disclosure describes systems and methods for controlling movement of a machine. Such systems and methods may be applicable to any machine or machine system benefiting from accurate, real time detection of the variables to completely describe the system behavior as a function of time (such as position, velocity, linear acceleration, and angular rate of motion of each machine component). The disclosed sensor fusion system in conjunction with multiple IMUs and non-IMU sensors coupled to components of the machine may provide for improved estimation of the positions and orientations of all of the components by utilizing a Kalman filter associated with each IMU mounted on each of a plurality of machine components.

As described herein, the Kalman filter may calculate an uncertainty for a predicted position that may be set equal to the uncertainty as designated by an error covariance matrix of the Kalman filter. Various positions on the machine may also be determined independently from the IMUs. Having determined the independent position measurements, the Kalman filter may be configured to fuse the predicted position information and the independent position measurement to determine updated position estimates for each location. Kalman filter measurement update equations may be utilized to determine the updated position estimate. Having determined an updated position estimate for the machine, the Kalman filter may also determine the biases for each of the IMUs.

In one example of the machine state control system according to an implementation of this disclosure, accurate, updated, real time information on the positions and orientations (pose) of the machine and components of the machine may provide feedback to an information exchange interface in order to effect machine controls that achieve optimal positioning and operation of the machine and components of the machine for improved productivity and reliability. The feedback may assist an operator by coaching the operator on how to effect controls that result in improved machine footing and stability, and hence improved productivity. Sensor feedback from machine sensors regarding machine linkage positions and velocity, machine pitch rate and roll rate, and swing angle for a boom and stick of an excavator may be fused. The fused data may be provided to the information exchange interface 350 in order to affect the generation of control command signals that change the operation of various solenoid actuators, throttle controls, fluid cylinder actuation devices, electrical controls, and motion control devices to result in the optimal positioning of the machine during a digging operation. The systems and methods described herein may provide accurate and real time updated information to a human operator in some implementations, as well as acting as an information interface with autonomous or semi-autonomous control systems that use the information to process control command signals for operating various machine systems and machine subsystems automatically or semi-automatically.

The sensor fusion system may receive, combine, and process operator command inputs received from operator controls with inputs from IMUs and non-IMU machine sensors that measure linkage position, fluid pressures, engine speed, machine pose, machine component positions and orientations (including pitch rate, yaw rate, and roll rate), inputs from a vision system that includes perception sensors providing signals indicative of the presence and location of objects, and inputs from hydraulic system sensors.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

What is claimed is:

1. A method of controlling movement of a machine, the method comprising:
    sensing, with a first inertial measurement unit (IMU) module associated with a first component of the machine, first data indicative of at least one of a first orientation or a first motion of the first component, the first IMU module including a first state estimator;
    receiving, by the first state estimator of the first IMU module, from a second IMU module associated with a second component of the machine, and via a communication bus directly communicatively coupling the first IMU module with the second IMU module, a state estimation associated with the second component, the second IMU module including a second state estimator that determines the state estimation associated with the second component based at least in part on second data sensed by the second IMU module;
    with the first state estimator of the first IMU module:
        combining the first data received from the first IMU module with the state estimation associated with the second component to generate third data;
        determining an estimated output orientation and an estimated output motion for the first component based on the third data; and
        determining a state estimation associated with the first component based on a kinematic evaluation using the estimated output orientation and the estimated output motion; and
    controlling, with a machine controller, the first component based on the state estimation associated with the first component.

2. The method of claim 1, wherein the combining of the first data with the state estimation associated with the second component includes combining the first orientation or the first motion of the first component with a second orientation or second motion of the second component to determine the estimated output orientation and the estimated output motion for the first component.

3. The method of claim 1, wherein the combining the first data received from the first IMU module with the state estimation of the second component includes fusing at least two of:
    first orientation measurements and first motion measurements from the first IMU module;
    second orientation measurements and second motion measurements from the second IMU module; or
    at least one additional measurement obtained from at least one additional sensor device;
to determine the estimated output orientation and the estimated output motion for the first component of the machine on which the first IMU module is mounted.

4. The method of claim 1, further comprising:
    receiving, from the machine controller, a programmed series order by which the first IMU module and the second IMU module combine data; and
    with the first IMU, receiving the state estimation of the second component from the second IMU module in response to a determination that the programmed series order allows the first IMU module to combine the first data and the state estimation of the second component based on the programmed series order.

5. The method of claim 1, wherein:
    the first state estimator includes a Kalman filter to:
        receive orientation measurements and motion measurements over a period of time; and
        remove noise by estimating orientation measurement values and motion measurement values by varying an averaging factor to optimize a weight assigned to estimated values as compared to a weight assigned to actual measured values, the estimated orientation measurement and estimated motion measurement converging on a best estimate of true values for output joint angles, velocity, or acceleration for components of the machine.

6. The method of claim 5, wherein varying the averaging factor to optimize the weight assigned to estimated values as compared to the weight assigned to actual measured values includes:
    determining first weight to be associated with a number of successive a priori estimates of an output joint angle for the first component and the second component relative to a second weight to be associated with a number of successive a posteriori estimates based on successive actual measured values received from the first IMU module and the second IMU module; and
    assigning a Kalman gain representative of the first weight and the second weight relative to each other.

7. The method of claim 1, further comprising determining a real time value for at least one of position, velocity, or acceleration of the first component or the second component of the machine based on the kinematic evaluation, wherein the kinematic evaluation is based on the estimated output orientation and the estimated output motion for the first component of the machine and dimensional design information characterizing the machine.

8. The method of claim 1, further comprising determining for the first component and the second component of the machine, and based on a real time value for at least one of position, velocity, or acceleration of the first component and the second component, a location and an orientation, relative to a global reference frame, of the first IMU module and the second IMU module positioned on the first component and the second component.

9. The method of claim 8, further comprising applying an offset to the location and orientation of the first IMU module and the second IMU module positioned on the first component and the second component of the machine, respectively, to determine a pose of another point of interest on the first component or on the second component.

10. A system to control movement of a machine, comprising:
a first inertial measurement unit (IMU) module mounted on a first component of the machine, the first IMU module including:
a first IMU;
a first processing device; and
a first state estimator;
a second IMU module mounted on a second component of the machine, the second IMU module including:
a second IMU;
a second processing device; and
a second state estimator;
a communication bus directly communicatively coupling the first IMU module and the second IMU module; and
a machine controller;
wherein the first IMU module:
senses first data indicative of at least one of a first orientation or a first motion of the first component;
receives a communication from the second IMU module via the communication bus, the communication including second data comprising a state estimation associated with the second component and generated by the second state estimator of the second IMU module;
combines the first data with the second data to generate third data;
determines an estimated output orientation and an estimated output motion for the first component based on the third data; and
determines at least one of a position, a velocity, or an acceleration of the first component and the second component based on the estimated output orientation and estimated output motion,
wherein the machine controller controls movement of at least one of the first component or the second component based on the position, the velocity, or the acceleration.

11. The system of claim 10, wherein the first component of the machine or the second component of the machine comprises a traction device, a machine body, a boom, a stick, or a work tool.

12. The system of claim 10, further comprising at least one additional sensor device to provide at least one additional measurement, wherein combining the first data received from the first IMU module with the second data from the second IMU module to generate the third data further comprises combining at least one of:
first orientation measurements and first motion measurements from the first IMU module;
second orientation measurements and second motion measurements from the second IMU module; or
the at least one additional measurement obtained from the at least one additional sensor device.

13. The system of claim 12, wherein the at least one additional sensor device includes a sensor configured to detect at least one of another position, another velocity, or another acceleration of the first component or the second component.

14. The system of claim 12, wherein the at least one additional sensor device is coupled to the first IMU module via the communication bus.

15. The system of claim 10, wherein the estimated output orientation and estimated output motion determined by the first IMU module are combined, by the second IMU module, with data collected by the second IMU module.

16. A non-transitory computer readable medium to control movement of a machine comprising computer usable program code embodied therewith, the computer usable program code, when executed by a processor, configured for:
sensing, with a first inertial measurement unit (IMU) module associated with a first component of the machine, first data indicative of at least one of a first orientation or a first motion of the first component, the first IMU module including a first state estimator;
receiving, by the first IMU module, a communication from a second IMU module associated with a second component of the machine, the communication including second data indicative of a state estimation of the second component, the second IMU module including a second state estimator for generating the state estimation of the second component, wherein the first IMU module receives the communication via a communication bus forming a mesh network, and the communication bus directly communicatively connects the first IMU module with the second IMU module across the mesh network;
with the first state estimator of the first IMU module:
combining the first data sensed with the first IMU module with the second data from the second IMU module to generate third data;
determining estimates of output orientation data and output motion data for the first component of the machine with respect to the second component of the machine and in reference to a machine reference frame based on the third data;
determining a real time value for at least one of position, velocity, or acceleration of the first component or the second component of the machine based on a kinematic evaluation using the output orientation data and output motion data for the first component of the machine; and
outputting the real time value to a machine controller.

17. The non-transitory computer readable medium of claim 16, further comprising computer usable program code to, when executed by the processor, control at least one of the first component and the second component based on the real time value.

18. The non-transitory computer readable medium of claim 16, further comprising computer usable program code to, when executed by the processor, determine for the first component of the machine, and based on the real time value for at least one of the position, the velocity, or the acceleration of the first component of the machine, a location and an angular orientation relative to a global reference frame of the first IMU module and the second IMU module positioned on the first component and the second component of the machine.

19. The non-transitory computer readable medium of claim 16, further comprising computer usable program code to, when executed by the processor, apply an offset to a location and orientation of the first IMU module and the second IMU module positioned on the first component and the second component of the machine to solve for a pose of another point of interest on the first component and the second component of the machine.

20. The non-transitory computer readable medium of claim 16, wherein the combining the first data with the second data to generate the third data includes combining at least one of:
first orientation measurements and first motion measurements from the first IMU module;

second orientation measurements and second motion measurements from the second IMU module; and at least one additional measurement obtained from at least one additional sensor device;

to estimate the output orientation data and output motion data for the first component of the machine on which the first IMU module is mounted.

\* \* \* \* \*